United States Patent
Li et al.

(10) Patent No.: US 12,328,172 B2
(45) Date of Patent: Jun. 10, 2025

(54) BEAM MANAGEMENT FOR NEW RADIO VEHICLE COMMUNICATIONS

(71) Applicant: InterDigital Patent Holdings, Inc., Wilmington, DE (US)

(72) Inventors: Yifan Li, Conshohocken, PA (US); Qing Li, Princeton Junction, NJ (US); Guodong Zhang, Woodbury, NY (US); Allan Y. Tsai, Boonton, NJ (US); Pascal M. Adjakple, Great Neck, NY (US); Lakshmi R. Iyer, King of Prussia, PA (US); Mohamed Awadin, Plymouth Meeting, PA (US); Joseph M. Murray, Schwenksville, PA (US); Zhuo Chen, Claymont, DE (US); Rocco Di Girolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 369 days.

(21) Appl. No.: 17/632,360

(22) PCT Filed: Aug. 12, 2020

(86) PCT No.: PCT/US2020/045972
§ 371 (c)(1),
(2) Date: Feb. 2, 2022

(87) PCT Pub. No.: WO2021/034572
PCT Pub. Date: Feb. 25, 2021

(65) Prior Publication Data
US 2022/0286184 A1 Sep. 8, 2022

Related U.S. Application Data

(60) Provisional application No. 62/888,002, filed on Aug. 16, 2019.

(51) Int. Cl.
*H04B 7/06* (2006.01)
*H04B 7/08* (2006.01)
(Continued)

(52) U.S. Cl.
CPC .......... *H04B 7/0695* (2013.01); *H04B 7/088* (2013.01); *H04L 5/0051* (2013.01); *H04W 16/28* (2013.01);
(Continued)

(58) Field of Classification Search
CPC ...... H04B 7/0695; H04B 7/088; H04B 7/063; H04L 5/0051; H04L 5/001; H04L 5/006;
(Continued)

(56) References Cited

U.S. PATENT DOCUMENTS

2006/0030365 A1* 2/2006 Hovers .................. H04B 7/04
455/562.1
2019/0045494 A1* 2/2019 Ho ........................ H04W 76/27
(Continued)

FOREIGN PATENT DOCUMENTS

EP 3709531 A1 9/2020
WO WO 2019/036578 A1 2/2019
(Continued)

OTHER PUBLICATIONS

3rd Generation Partnership Project (3GPP), "Discussion of RLM for Unicast", OPPO, Mobile Competence Centre ; 650, Route Des Lucioles ; F-06921 Sophia-Antipolis Cedex ; France, vol. RAN WGI, No. Reno, USA; May 13, 2019-May 17, 2019, May 13, 2019, XP051727926.
(Continued)

*Primary Examiner* — Kiet Tang
(74) *Attorney, Agent, or Firm* — Flaster Greenberg P.C.

(57) ABSTRACT

A user equipment (UE) determines sidelink resources for use in vehicle wireless communications. Initial beam establish-
(Continued)

ment uses a Sidelink Synchronization Signal (SLSS), a Sidelink Channel State Information Reference Signal (SL-CSI-RS), or a Sidelink Demodulation Reference Signal (SL-DMRS). Beam refinement may then be conducted either by UEs in communication with each other, or by just one of the UEs. A base station such as a gNB may assign resources for a dedicated sidelink carrier or a shared licensed sidelink carrier, e.g., dynamically, as pre-configured by RRC, or based on activation and deactivation. In such cases, initial beam establishment and refinement may include gNB controlled beam forming at a connectionless stage, gNB controlled beam forming at connection stage with scheduling DCI transmitted to Tx UE only, or gNB controlled beam forming at connection stage with scheduling DCI transmitted to both Tx UE and Rx UE.

18 Claims, 35 Drawing Sheets

(51) Int. Cl.
*H04L 5/00* (2006.01)
*H04W 16/28* (2009.01)
*H04W 72/1263* (2023.01)
*H04W 72/23* (2023.01)
*H04W 76/14* (2018.01)
*H04W 92/18* (2009.01)

(52) U.S. Cl.
CPC ....... *H04W 72/1263* (2013.01); *H04W 72/23* (2023.01); *H04W 76/14* (2018.02); *H04W 92/18* (2013.01)

(58) Field of Classification Search
CPC ... H04L 5/0023; H04L 5/0033; H04L 5/0048; H04L 5/0092; H04L 1/0063; H04W 16/28; H04W 72/1263; H04W 72/23; H04W 76/14; H04W 92/18
See application file for complete search history.

(56) References Cited

U.S. PATENT DOCUMENTS

| 2019/0173612 A1* | 6/2019 | Kimura | H04L 1/0063 |
| 2019/0254110 A1* | 8/2019 | He | H04L 5/0048 |
| 2020/0359445 A1* | 11/2020 | Wu | H04W 76/14 |

FOREIGN PATENT DOCUMENTS

| WO | 2019/128873 A1 | 7/2019 |
| WO | 2019/148455 A1 | 8/2019 |

OTHER PUBLICATIONS

Spreadtrum Communications: "Considerations on beam-based transmission for Sidelink", 3GPP Draft; RI-1811003, 3rd generation Partnership project (3GPP), Mobile Competence Centre ; 650, Route Des Lucioles; F-06921 Sophia-Antipolis Cedex; France, vol. RAN WGI, No. Chengdu, China; Oct. 8, 2018-Oct. 12, 2018, Sep. 29, 2018, XP051518407.
Xiaomi: "Enhancements on beam management", 3GPP Draft; RI-1907444 Beam, 3rd Generation Partnership Project (3GPP), Mobile Competence Centre; vol. RAN WGI, No. Reno, USA; May 13, 2019-May 17, 2019, May 3, 2019, XP051709458.
$3^{rd}$ Generation Partnership Project; "Technical Specification Group Services and System Aspects; Study on enhancement of 3GPP Support for 5G V2X Services (Release 15)", 3GPP TR 22.886 V15.2.0, Jun. 2018, 58 pages.
$3^{rd}$ Generation Partnership Project; "Technical Specification Group Services and System Aspects; Enhancement of 3GPP support for V2X scenarios; Stage 1 (Release 15)", 3GPP TS 22.186 V15.3.0, Jun. 2018, 16 pages.

* cited by examiner

BEAM MANAGEMENT FOR NEW RADIO VEHICLE COMMUNICATIONS

CROSS-REFERENCE TO RELATED APPLICATIONS

This application is the National Stage Application of International Patent Application No. PCT/US2020/045972 filed Aug. 12, 2020, which claims the benefit of U.S. Provisional Patent Application No. 62/888,002, filed 16 Aug. 2019, entitled "BEAM MANAGEMENT FOR NEW RADIO VEHICLE COMMUNICATIONS", the contents of which are hereby incorporated by reference herein.

BACKGROUND

This disclosure pertains to beam forming in vehicle wireless communications, e.g., for new radio, and as described in 3GPP TR 22.886 Study on enhancement of 3GPP Support for 5G V2X Services, Release 15, V15.2.0, and 3GPP TS 22.186 Enhancement of 3GPP support for V2X scenarios (Stage 1), Release 15, V15.3.0.

SUMMARY

In new radio, where a user equipment (UE) determines sidelink resources for use in vehicle wireless communications, initial beam establishment may be achieved using a Sidelink Synchronization Signal (SLSS), a Sidelink Channel State Information Reference Signal (SL-CSI-RS), or a Sidelink Demodulation Reference Signal (SL-DMRS), for example. Beam refinement may then be conducted either by two user equipment (UEs) in communication with each other, or by just one of the UEs.

A base station such as a gNB may assign resources for a dedicated sidelink carrier or a shared licensed sidelink carrier, e.g., dynamically, as pre-configured by RRC, or based on activation and deactivation. In such cases, initial beam establishment and refinement may include gNB controlled beam forming at a connectionless stage, gNB controlled beam forming at connection stage with scheduling DCI transmitted to Tx UE only, or gNB controlled beam forming at connection stage with scheduling DCI transmitted to both Tx UE and Rx UE.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figures 1A, 1B:
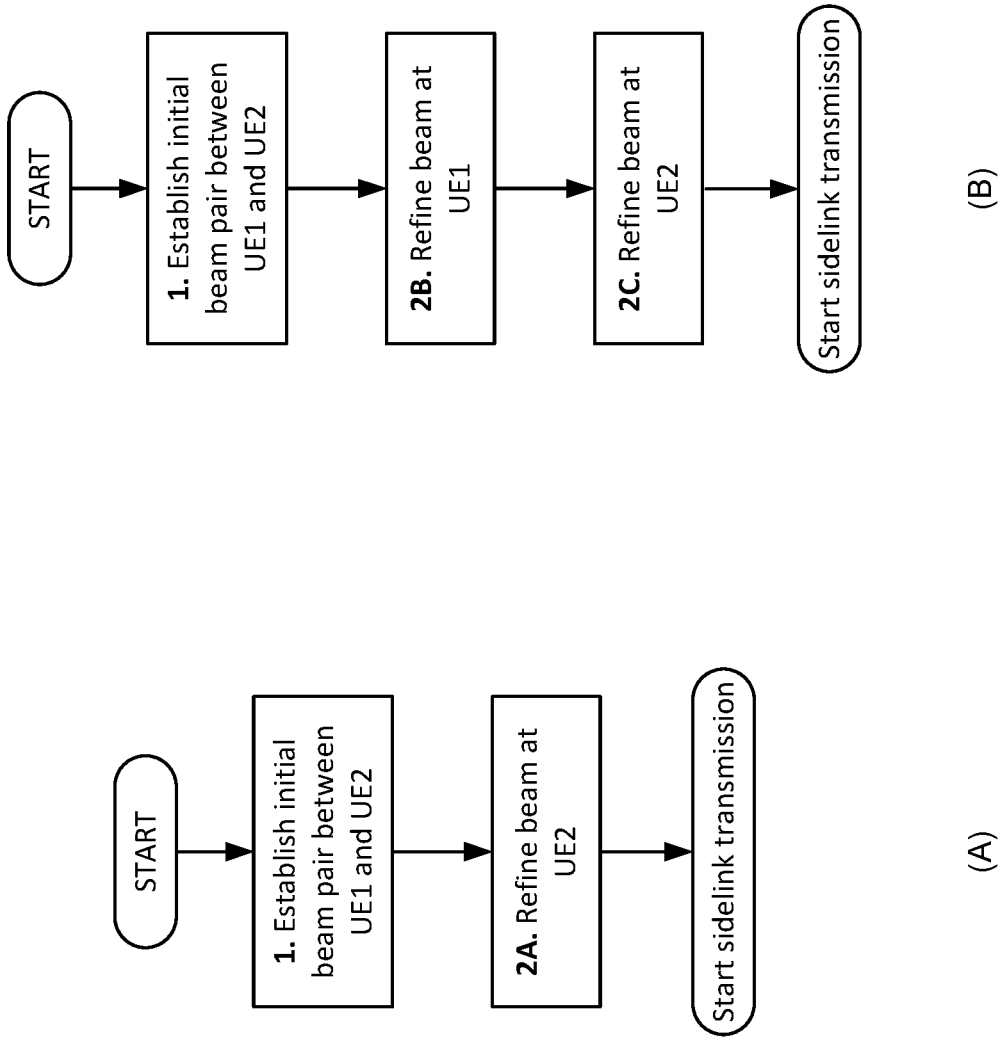
FIG. 1A is a flow diagram of an example beam forming procedure with beam refinement by one UE.
FIG. 1B is a flow diagram of an example beam forming procedure with beam refinement by two UEs.

Table 1 includes many abbreviations used herein.

TABLE 1

| Abbreviations | |
| --- | --- |
| BSR | Buffer Status Report |
| DCI | Downlink Control Information |
| FR1 | Frequency Range 1 |
| GNSS | Global Navigation Satellite System |
| L1-SINR | Layer-1 Signal to Interference Noise Ratio |
| LTE | Long Term Evolution |
| MAC | Medium Access Control |
| MAC-CE | MAC Control Element |
| MSB | Most Significant Bit |
| NR | New Radio |
| PSCCH | Physical Sidelink Control Channel |
| PSSCH | Physical Sidelink Shared Channel |
| QCL | Quasi Co-Locate |
| QoS | Quality of Service |
| RAN | Radio Access Network |
| RRC | Radio Resource Control |
| RS | Reference Signal |
| RSRP | Reference Signal Received Power |
| RSRQ | Reference Signal Received Quality |
| SCI | Sidelink Control Information |
| SL-CSI-RS | Sidelink Channel State Information Reference Signal |
| SL-DMRS | Sidelink Demodulation Reference Signal |
| SLSS | Sidelink Synchronization Signal |
| SR | Scheduling Request |
| TCI | Transmission Configuration Indicator |
| UE | User Equipment |
| V2V | Vehicle-to-Vehicle |
| V2X | Vehicle-to-everything |

LTE V2X

Vehicular communication services, represented by LTE V2X services, can consist of the following four different types: V2V, V2I, V2N and V2P.

V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorized to be used for V2X services can perform V2X sidelink communication.

LTE-Uu can be unicast and/or MBMS. These two operation modes may be used by a UE independently for transmission and reception, e.g. a UE can use MBMS for reception without using LTE-Uu for transmission. A UE may also receive V2X messages via LTE-Uu unicast downlink.

Use Cases and Requirements for NR V2X

As Vehicle-to-everything (V2X) applications make significant progress, transmission of short messages about vehicles' own status data for basic safety needs to be extended with transmission of larger messages containing raw sensor data, vehicles' intention data, coordination, confirmation of future man oeuvre, etc. For these advanced applications, the expected requirements to meet the needed data rate, latency, reliability, communication range and speed are made more stringent.

For enhanced V2X (eV2X) services, 3GPP has identified 25 use cases and the related requirements in 3GPP TR 22.886 Study on enhancement of 3GPP Support for 5G V2X Services, Release 15, V15.2.0.

A set of the normative requirements are specified in 3GPP TS 22.186 Enhancement of 3GPP support for V2X scenarios (Stage 1), Release 15, V15.3.0, where the use cases are categorized into four groups: vehicle platooning, extended sensors, advanced driving, and remote driving.

Among the 25 identified use cases, high data rate and/or long communication range is required by the following use cases: sensor and state map sharing, information sharing for high/full automated driving, information sharing for high/full automated platooning, and video data sharing for assisted and improved automated driving.

The detailed description of performance requirements for each use case group is specified in TS 22.186.

Resource Allocation Mode in NR V2X

In NR V2X, sidelink resource allocation mode 1 and mode 2 are supported. In mode 1, the base station schedules the sidelink resources used by the UE for sidelink transmission. In mode 2, a UE determines the sidelink resources used for sidelink transmission within the sidelink resources configured by the base station or pre-configured sidelink resources.

Mode 1 supports the gNB to assign the sidelink resources for both dedicated sidelink carrier and shared licensed carrier between Uu and sidelink through the Uu interface. The resources used for sidelink transmission may be dynamically allocated, or pre-configured by the RRC, or based on activation and deactivation.

In mode 2, the resources used for sidelink transmission may be determined by following resource allocation sub-modes: UE autonomously selects sidelink resource for transmission, UE assists sidelink resource selection for other UE(s), UE is configured with NR configured grant (type-1 like) for sidelink transmission, and UE schedules sidelink transmissions of other UEs.

Example Challenges

In NR beam management P1, gNB sweeps the beams and sends different SSBs on each beam. A UE measures the SSBs and indicates the preferred beam for initial beam establishment by performing the random-access transmission associated with the selected SSB. In NR V2X, a UE may try to establish beam pair link with a synchronization source V2X UE or a non-synchronization source V2X UE, where only synchronization source V2X UE will send SSB, and non-synchronization source will not send SSB. Also, PRACH is not supported in NR V2X. The mechanism UEs establish their beam pair link in NR V2X needs to be addressed.

Example Solutions

Beam management in NR V2X may be managed in several ways. For example, initial beam establishment in NR V2X mode 2 may include initial beam establishment using SLSS, SL-CSI-RS, or SL-DMRS, for example, as well as a mechanism for reporting the preferred beam. Procedures for beam refinement in NR V2X mode 2 may include refinement at both UE, for example, or only at the Rx UE side.

Similarly, there are options for procedures of gNB controlled initial beam establishment and beam refinement in NR V2X mode 1. These include, for example: gNB controlled beam forming at connectionless stage; gNB controlled beam forming at connection stage with scheduling DCI transmitted to Tx UE only; and gNB controlled beam forming at connection stage with scheduling DCI transmitted to both Tx UE and Rx UE.

Beam Forming and Management in NR V2X Mode 2

In NR V2X mode 2, two UEs (UE1 and UE2), e.g., two vehicular UEs, or one vehicular UE and one non-vehicular UE, etc., may form beam pair link to conduct sidelink communication. High-level overviews of the beam forming procedures are depicted in FIG. 1A and FIG. 1B.

Step 1 of FIG. 1A and FIG. 1B is initial beam establishment at connectionless or at connection stage. One vehicular UE, e.g., UE1, may sweep the beams and transmit reference signal (RS) on each beam. The other UE, e.g., UE2, may monitor and measure the transmitted RS. Based on the measurement result, UE2 may identify the preferred beam and establish the initial beam pair with UE1.

Step 2 is beam refinement at connection stage, wherein, after establishing the initial beam pair, UE1 and UE2 may further refine the beam pair to improve the beam condition. This may be done in different ways, as illustrated in the FIGS. 1A and 1B. In step 2A of FIG. 1A, beam refinement occurs at the UE2 side only. UE1 may use the beam identified in the initial beam establishment as the Tx beam for the sidelink communication. Or UE1 may form a narrow beam that is quasi co-located (QCL-ed) with the beam identified in the initial beam establishment, e.g., pointing to the same direction with narrower beam width, as the Tx beam. The UE2 may further refine its beam to have a better alignment with the beam used by UE1.

In step 2B of FIG. 1B, beam refinement first occurs at the at UE1 side. With the knowledge of the identified beam in the initial beam establishment, UE1 may further refine its beam, e.g., UE1 may perform another beam sweeping with narrower beams. UE2 may measure and identify the preferred beam among the refined UE1 beams. In step 2C of FIG. 1B, beam refinement then occurs at the UE2 side, whereby. UE2 may further refine its beam to have a better alignment with the refined beam used by UE1.

Initial Beam Establishment at Connectionless Stage

In an example Case 1, before UE1 and UE2 can communicate on the sidelink, the two UEs need to get synchronized. UE1 may be the synchronization source and send sidelink synchronization signal (SLSS). UE2 monitors and detects the SLSS to get synchronized with UE1, and vice versa.

In another example Case 2, UE1 and UE2 may be synchronized with another synchronization source, where it can be the Global Navigation Satellite System (GNSS), a NR gNB, an LTE eNB, a NR V2X RSU, a NR V2X synchronization UE, or an LTE V2X synchronization UE. After UE1 and UE 2 get synchronized, discovery procedure is performed and then they can communicate on the sidelink.

Figure 2:
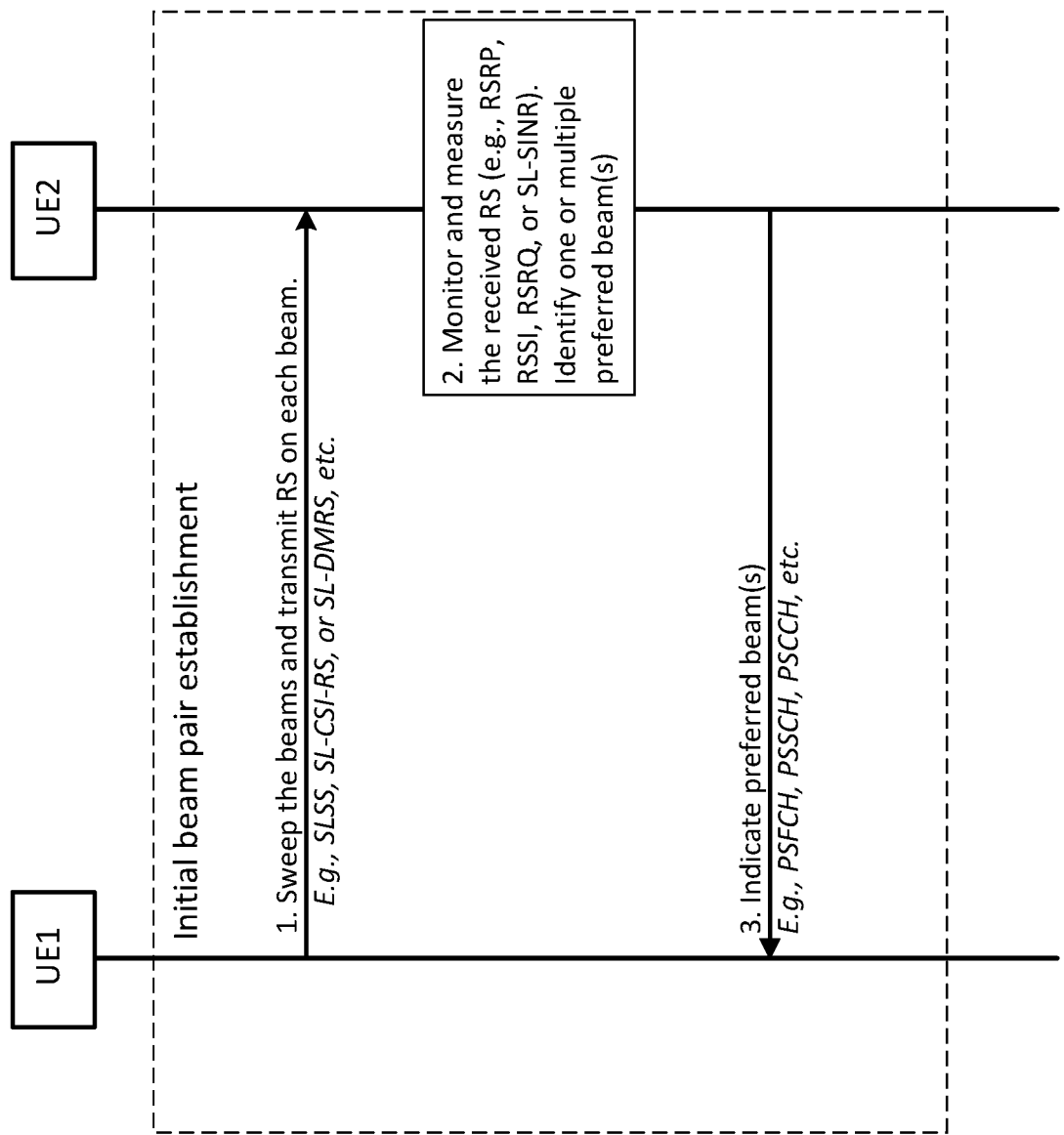
FIG. 2 is a call flow of an example initial beam establishment procedure at connectionless stage.

When UE1 and UE2 want to communicate on the sidelink through beam pair, a high-level overview of an example initial beam establishment procedure is depicted in FIG. 2.

Step 1 of FIG. 2 is initial beam sweeping. One vehicular UE, e.g., UE1, may sweep the beams and transmit reference signal (RS) on each beam, where the RS may be an SLSS for Case 1, a sidelink channel state information reference signal (SL-CSI-RS), or a sidelink demodulation reference signal (SL-DMRS) for Case 1 and/or 2.

The RS may be transmitted standalone, e.g., SLSS for Case 1, standalone SL-CSI-RS for Case 1 and/or 2, where the RS does not need to be transmitted together with a data.

The RS may be transmitted with data or sidelink control information, e.g., SL-CSI-RS with PSSCH, SL-DMRS of PSCCH, or PSSCH. In another word, when UE1 does not have data or sidelink control information to transmit, it cannot transmit the RS. For example, the RS may be transmitted together with discovery message, regular data, or dummy data, on the physical sidelink shared channel (PSSCH). The RS may also be transmitted with the sidelink control information (SCI) on the PSCCH, e.g., SL-DMRS for physical sidelink control channel (PSCCH).

Step 2 is measuring and identifying the preferred beam or beams. UE2 monitors and measures the received RS. UE2 identifies the preferred beam(s) based on the measurement results.

For example, UE2 may measure the reference signal received power (RSRP), or the reference signal received quality (RSRQ), or the layer-1 signal to interference noise ratio (L1-SINR) of the received RS.

UE2 may identify one preferred beam, e.g., the beam on which the RS having the best measurement result is transmitted. Or UE2 may identify multiple preferred beams and form a preferred beam list. The measurement result of the identified beam(s) should be higher than a threshold, e.g., $Q_{thresh}$, otherwise, UE2 may claim no preferred beam is identified.

Step 3 is indicating the identified beam(s). UE2 indicates the identified preferred beam or beam list to UE1. Based on the response provided by UE2, UE1 may form one or multiple initial beam pair links with UE2.

Initial Beam Sweeping Using SLSS

The initial beam pair link may be established based on the SLSS transmitted by UE1. This may be applicable to the case when UE1 is a synchronization source, and when UE2 is synchronized with UE1 and UE2 wants to establish the beam pair with UE1.

As a synchronization source, UE1 may periodically sweep the beams to different directions with each beam associated with one SLSS.

When UE2 determines UE1 is the synchronization source within the proximity by detecting the SLSS transmitted from UE1, and if there is no other higher priority synchronization source available, e.g., GNSS, or NR gNB, or LTE eNB, UE2 will get synchronized with UE1. As UE1 is sweeping its SLSS, UE 2 may detect multiple SLSSs from UE1 with different measurement results. Based on the measurement results, UE2 may identity one or multiple beam(s) as the preferred beam. The measurement result of the identified beam(s) should be higher than a threshold, e.g., $Q_{thresh,SLSS}$, otherwise, UE2 may claim no preferred beam is identified.

UE2 may periodically monitor and measure the SLSS transmitted by UE1 before establishing initial beam pair link with UE1. There may be two scenarios that UE1 and UE2 may establish beam pair link with each other.

In one scenario, UE2 may be triggered by UE1, e.g., UE2 may receive an indication from UE1, to establish beam pair link. In another scenario, UE2 may be triggered by its higher layer, UE2 has data to be transmitted to UE1, to establish beam pair link.

When UE2 is triggered to establish beam pair link with UE1, UE2 may determine the preferred beam(s) using the latest measurement or k most recent measurements and report the preferred beam(s) to UE1.

Initial Beam Sweeping Using SL-DMRS or SL-CSI-RS Piggybacked with PSSCH

Initial beam sweeping may use SL-DMRS or SL-CSI-RS piggybacked with PSSCH. When a vehicular UE, e.g., UE1, initiates a first PSSCH transmission, for example a discovery procedure, in one case, it may transmit the discovery message e.g., 'I am here.', or 'who is there?' on the PSSCH using omni-direction antenna. Or, in another case, UE1 may sweep the discovery message on the PSSCH to different directions or certain direction(s) for discovery based on the potential discoverees' directions or locations using different beams.

SL-DMRS Based Initial Beam Sweeping

Figure 3A:
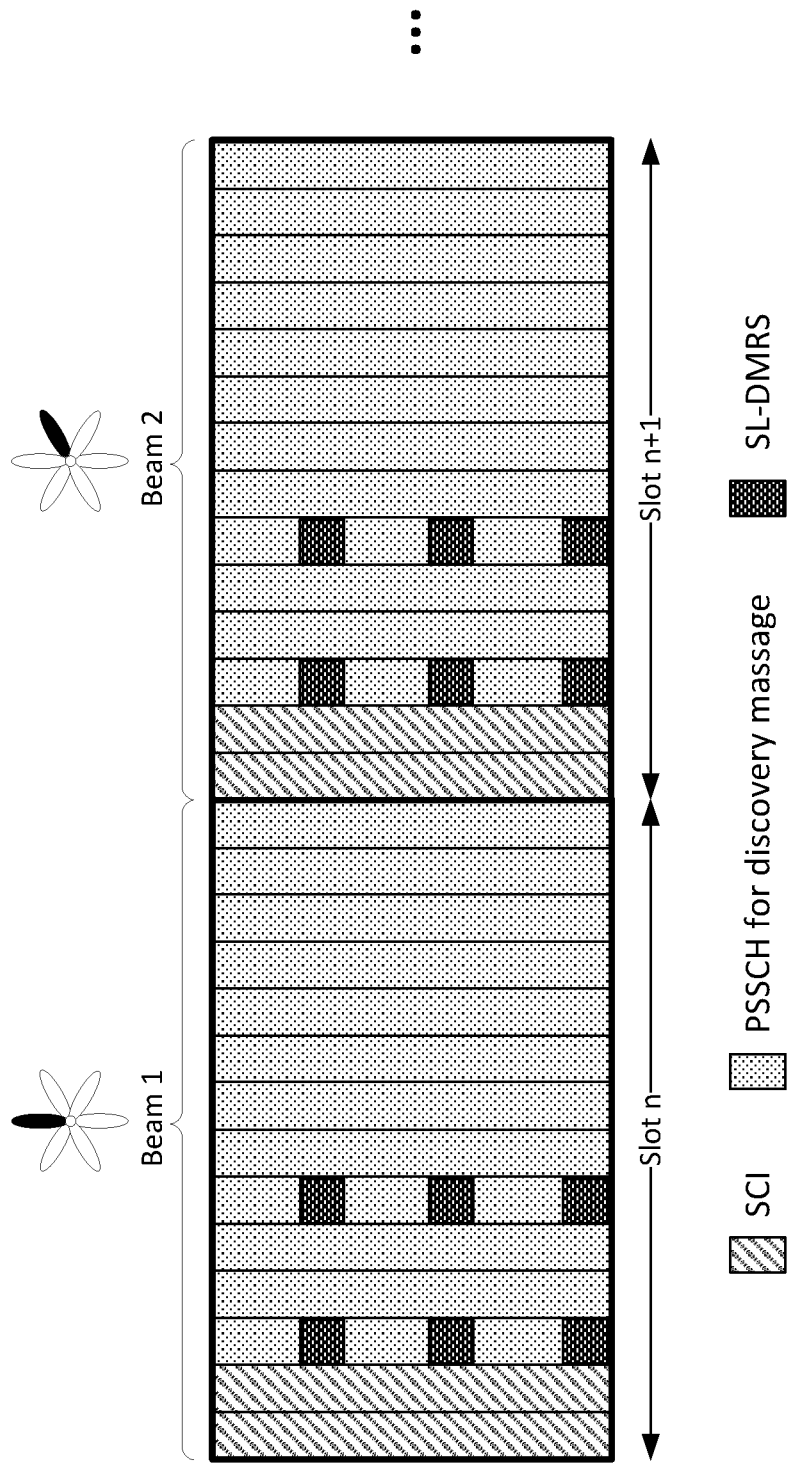
FIG. 3A shows an example of SL-DMRS based initial beam sweeping with slot level sweeping.
Figure 3B:
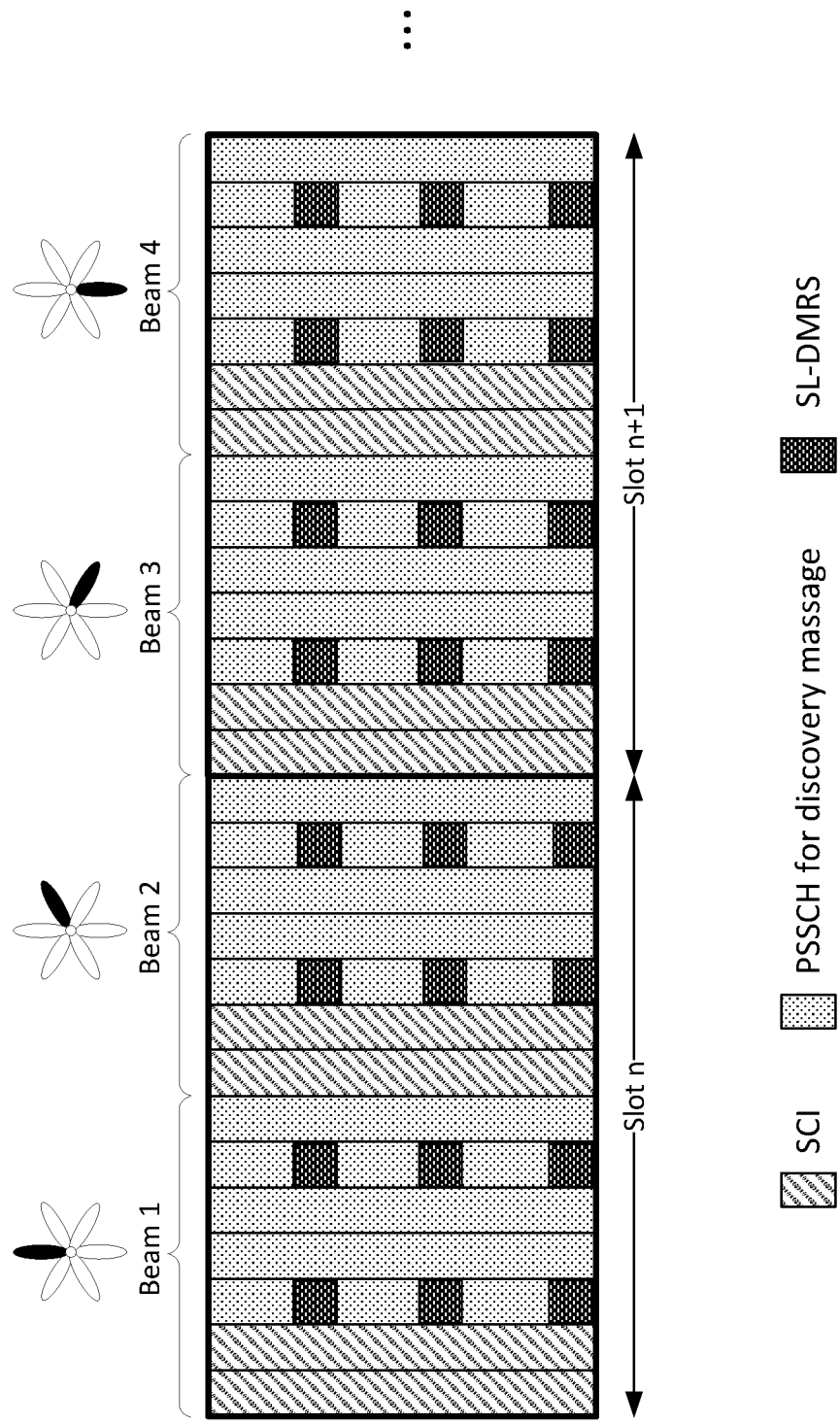
FIG. 3B shows an example of SL-DMRS based initial beam sweeping with mini-slot level sweeping.

When UE1 sweeps the discovery message on PSSCH, UE1 may transmit SL-DMRS with the PSSCH to assist other UEs to estimate the channel and decode the data as shown in FIG. 3A and FIG. 3B.

UE1 may transmit one discovery massage in one slot and sweep the beams in slot level as shown in FIG. 3A. Or, UE1 may transmit multiple discovery massages in one slot and sweep the beams in mini-lot level, where a mini-slot may contain 2-13 symbols, as shown in FIG. 3B.

The SL-DMRS for PSSCH which carries the discovery massage may be also used by other UEs to measure and identify the preferred beam(s).

For example, UE1 may transmit the PSSCH carrying the discovery massage on k beams, e.g., beam 1, beam 2, . . . , beam k. When UE2 monitors and detects the discovery massage, it may measure the received SL-DMRS on the PSSCH. Based on the measurement results, UE2 may identify one or multiple preferred beam(s). The measurement result of the identified beam(s) should be higher than a threshold, e.g., $Q_{thresh,DMRS}$, otherwise, UE2 may claim no preferred beam is identified.

The SL-DMRS configuration used in the PSSCH carrying the discovery massage may be associated with the beam and varies with the different beams. For example, the SL-DMRS for beam 1 and beam 2 may have different ports (e.g., RE mapping in the time domain and/or frequency domain) and/or sequences.

SL-CSI-RS Based Initial Beam Sweeping

Figure 4:
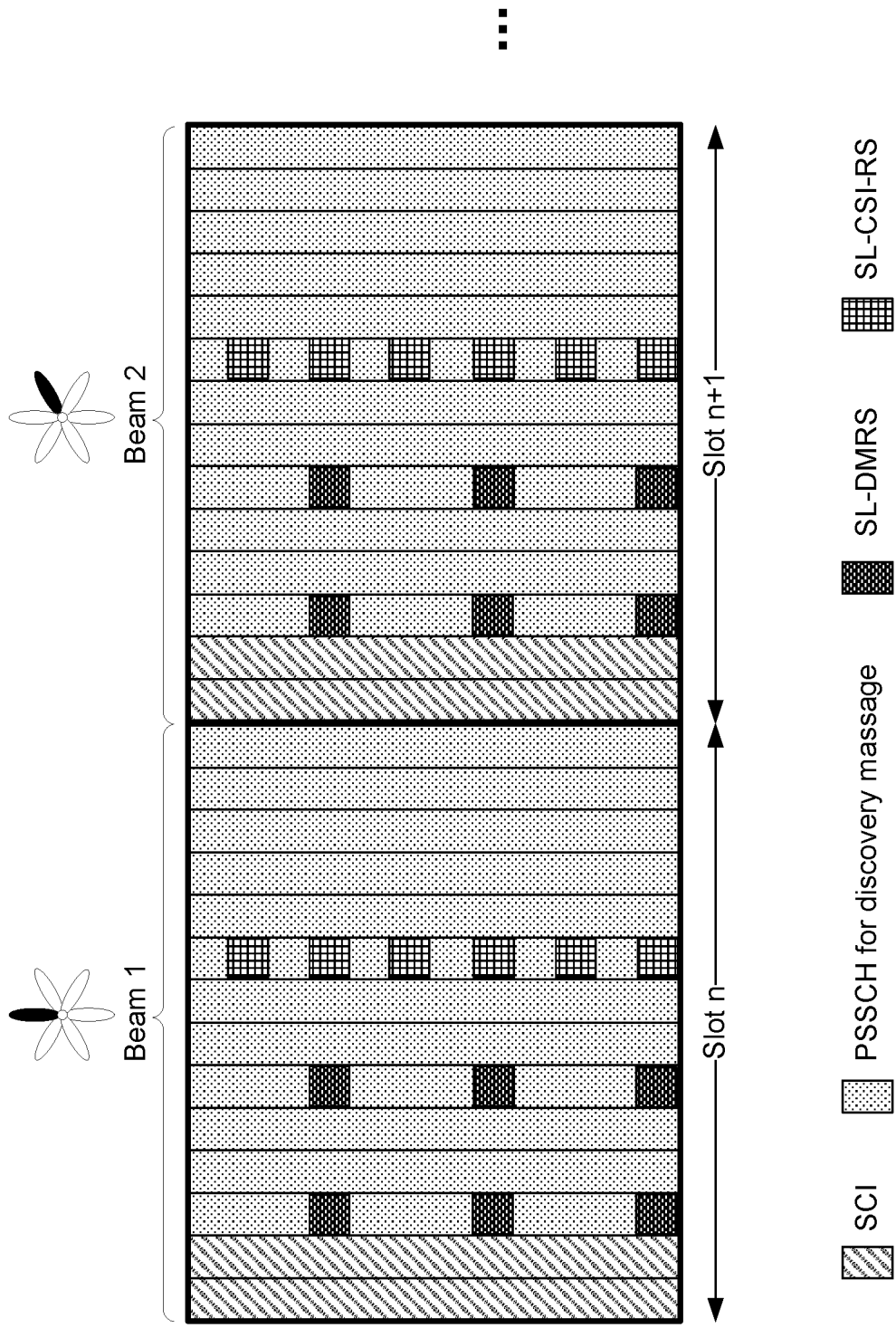
FIG. 4 illustrates an example of SL-CSI-RS based initial beam sweeping.

When a UE sends the PSSCH carrying the discovery massage, it may transmit SL-CSI-RS on the PSSCH for other UEs to measure and identify the preferred beam(s) as shown in FIG. 4.

The example in FIG. 4 shows an example of slot level SL-CSI-RS based beam sweeping. Like SL-DMRS based beam sweeping, the SL-CSI-RS based beam sweeping may be also swept in mini-slot level.

For a UE receiving the discovery massage, e.g., UE2, it may use the SL-DMRS on the PSSCH to estimate the channel and decode the data. UE2 may use the transmitted SL-CSI-RS on the PSSCH to measure the beam condition and identify the preferred beam(s). The measurement result of the identified beam(s) should be higher than a threshold, e.g., $Q_{thresh,CSI-RS}$, otherwise, UE2 may claim no preferred beam is identified.

The SL-CSI-RS configuration used in the PSSCH carrying the discovery massage may be associated with the beam and varies with the different beams. For example, the SL-CSI-RS for beam 1 and beam 2 may have different ports (e.g., RE mapping in the time domain and/or frequency domain) and/or sequences.

Beam Index Indicating

Each PSSCH carrying the discovery massage is associated with one beam index. To allow other UE to figure out the beam index of the beam transmitting the PSSCH, there are at least five alternatives.

First, the beam index information may be indicated by the SCI scheduling the PSSCH carrying the discovery massage. Before UE1 sends the PSSCH carrying the discovery message, UE1 will first send the SCI scheduling the PSSCH. In the scheduling SCI, a SCI field may be used to carry the beam index of the beam used for transmitting the scheduled PSSCH. For example, assume the maximum number of the supported beams is 32, a 5-bits field, e.g., beam index indicator field, may be used to explicit indicate the beam index. When 2-stage SCI is used to schedule the PSSCH carrying the discovery massage, this field may be carried by the $2^{nd}$ stage SCI. After UE2 decode this SCI field, it can figure out the beam index of the transmission.

Second, beam index information may be carried by the data payload. The beam index information may be carried by the data channel, e.g., PSSCH. The beam index information may be carried by the data transmitted on the PSSCH. After UE2 decodes the data transmitted on the PSSCH, it can figure out the beam index of the transmission.

Figure 5A:
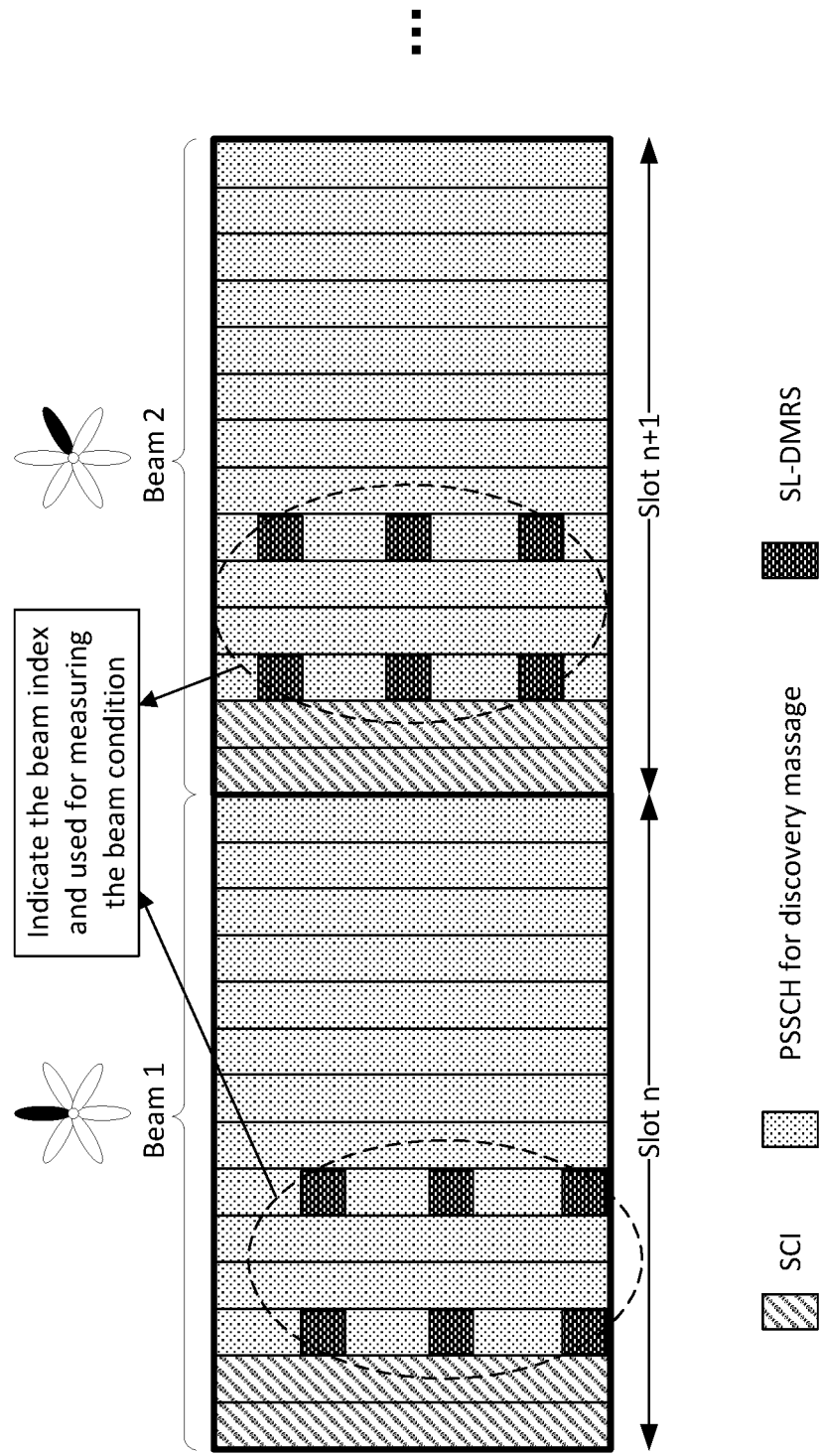
FIG. 5A illustrates an example of a beam index indicated by the RS with SL-DMRS indicating the beam index for SL-DMRS based beam measurement.
Figure 5B:
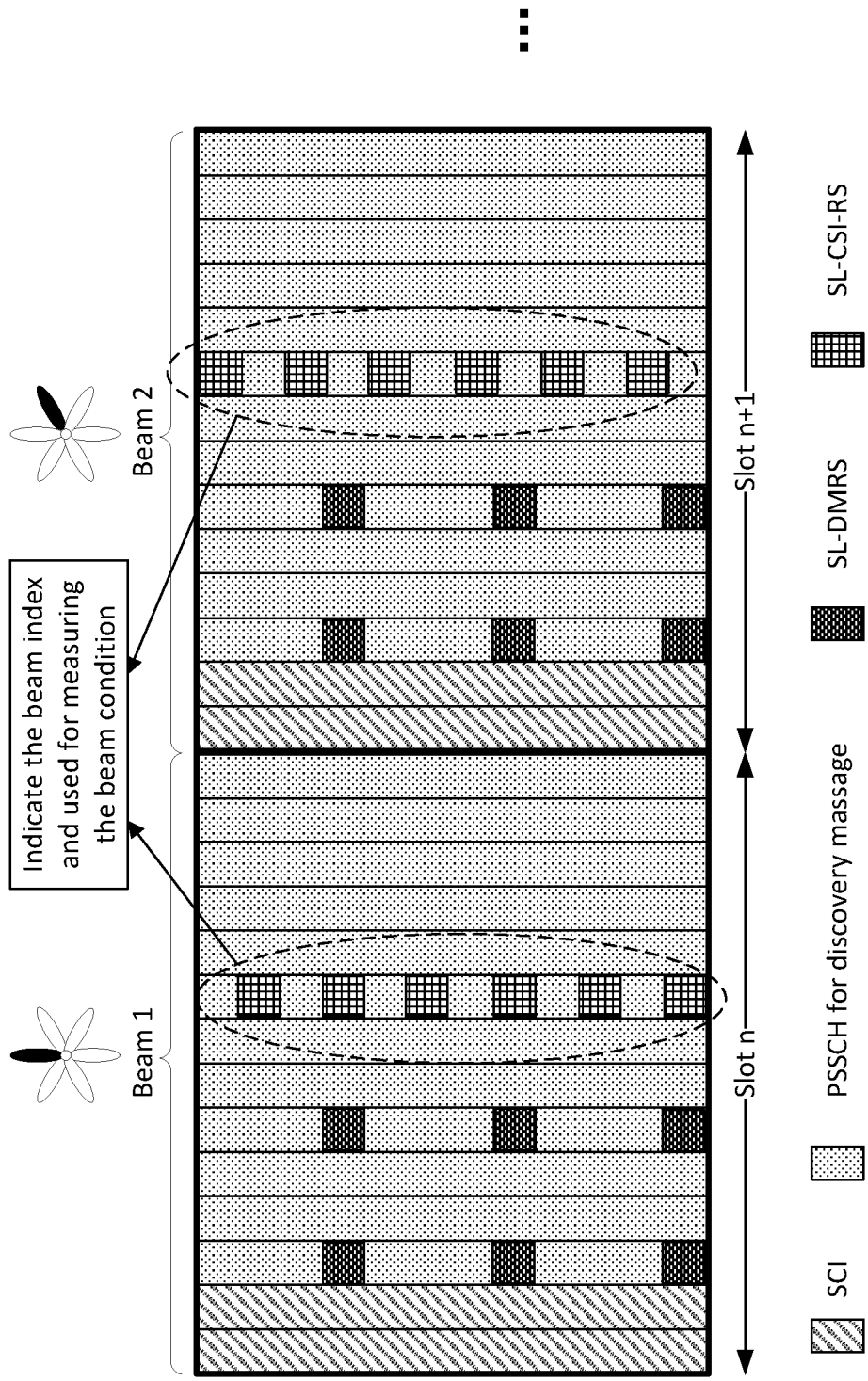
FIG. 5B illustrates an example of a beam index indicated by the RS with SL-CSI-RS indicating the beam index for SL-CSI-RS based beam measurement.
Figure 5C:
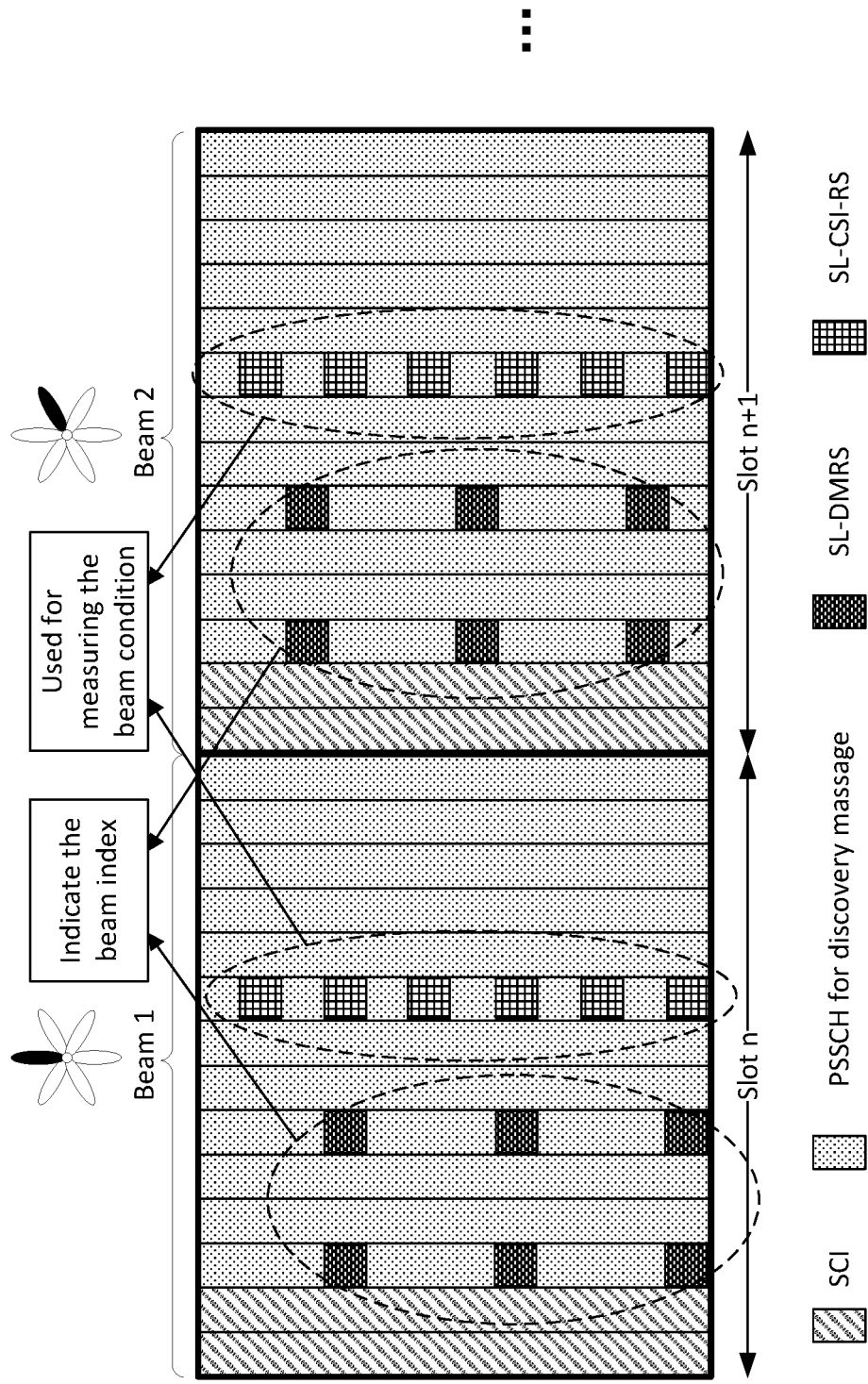
FIG. 5C illustrates an example of a beam index indicated by the RS with SL-DMRS indicating the beam index for SL-CSI-RS based beam measurement.

Third, the beam index information may be carried by the RS port. The beam index information may be carried by the RS port used in the PSSCH carrying the discovery massage or the RS port used in the PSCCH carrying the SCI. For example, the RS used in beam 1 and beam 2 may have different ports, e.g., RE mapping in the time domain and/or frequency domain. When SL-DMRS is used for beam measurement, such information may be carried by the SL-DMRS port as shown in FIG. 5A. When SL-CSI-RS is used for beam measurement, such information may be carried by the SL-CSI-RS port as shown in FIG. 5B; or may be carried by the SL-DMRS port as shown in FIG. 5C. UE1 may indicate the RS port information in the SCI associated with the PSSCH, e.g., using the SCI field 'CSI-RS port indicator field' or 'DMRS port indicator field'. UE2 determines the RS port information and the beam index information by decoding such SCI field. Or, UE1 may not indicate the RS port information in the SCI. UE2 determines the RS port information and the beam index information by blindly detecting the DMRS or CSI-RS transmitted in the PSSCH.

Fourth, the beam index information may be carried by the RS sequence. The beam index information may be carried by the RS sequence used in the PSSCH carrying the discovery massage or the RS port used in the PSCCH carrying the SCI. For example, the RS used in beam 1 and beam 2 may use different initialization sequences. When SL-DMRS is used for beam measurement, such information may be carried by the SL-DMRS sequence. When SL-CSI-RS is used for beam measurement, such information may be carried by the SL-CSI-RS sequence; or may be carried by the SL-DMRS sequence.

Fifth, the beam index information may be carried by a combination of the RS sequence and the RS port. For example, assume N total bits of information need to transmit to indicate the beam index. The k most significant bits (MSBs) may be carried by the RS port and the rest N-k bits may be carried by the RS sequence, and vice versa.

The PHY layer may need to know the V2X communication state to determine the corresponding procedure needed to be conducted, e.g., to start the initial beam establishment procedure, or to start the beam refinement procedure, etc. For example, if a UE (e.g., UE1) determines it is in the state of discovering with another UE (e.g., UE2), UE1 may conduct the initial beam establishment procedure to establish beam pair link with UE2.

A UE may be explicitly indicated with the V2X communication state. For example, when a UE receives a massage from the higher layer to be transmitted on the sidelink, the higher layer may send an indication to let the UE know if the massage is a discovery message or other massage. If the massage is a discovery message, the UE determines it is in the V2X discovery state. Or, in another alternative, a UE may be implicitly indicated with the V2X communication state. For example, a UE may implicitly derive the current V2X communication state from some known information.

When the UE transmits the discovery message on the sidelink using PSSCH, it may send an indication to notify other UEs if the data transmitted on the PSSCH is a discovery message or other data. Such information may be indicated in at least three ways.

First, a field in the scheduling SCI may be used to indicate if the scheduled PSSCH is carrying the discovery message or other data. For example, a 1-bit field, discovery massage indicator field, may be used. When the discovery massage indicator field is set to '0', it indicates the PSSCH is carrying other data; when the discovery massage indicator field is set to '1', it indicates the PSSCH is carrying the discovery massage.

Second, the SL-DMRS in the PSSCH or PSCCH may be used to indicate if the scheduled PSSCH is carrying the discovery message or other data by using different ports and/or different sequences. For example, the SL-DMRS in PSSCH carrying the discovery message and the SL-DMRS in PSSCH carrying other data may have different frequency offsets, e.g., one starts from RE0 and the other one starts from RE1. Or they may have different initialization sequences, e.g., they may have different $c_{init}$ values.

Third, the PSSCH that carries a discovery message may be transmitted on pre-configured resources, e.g., on the resource or resource pool dedicated for discovery only. Then, by detecting it, the UE knows it is a discovery message.

Initial Beam Establishment at Connection Stage

In some scenarios, the initial beam pair may not be automatically established during the synchronization procedure and the discovery procedure, which may apply to the case when the discovery procedure is not beam based, e.g., when two UEs use omni-direction antenna to do the discovery.

Figure 6:
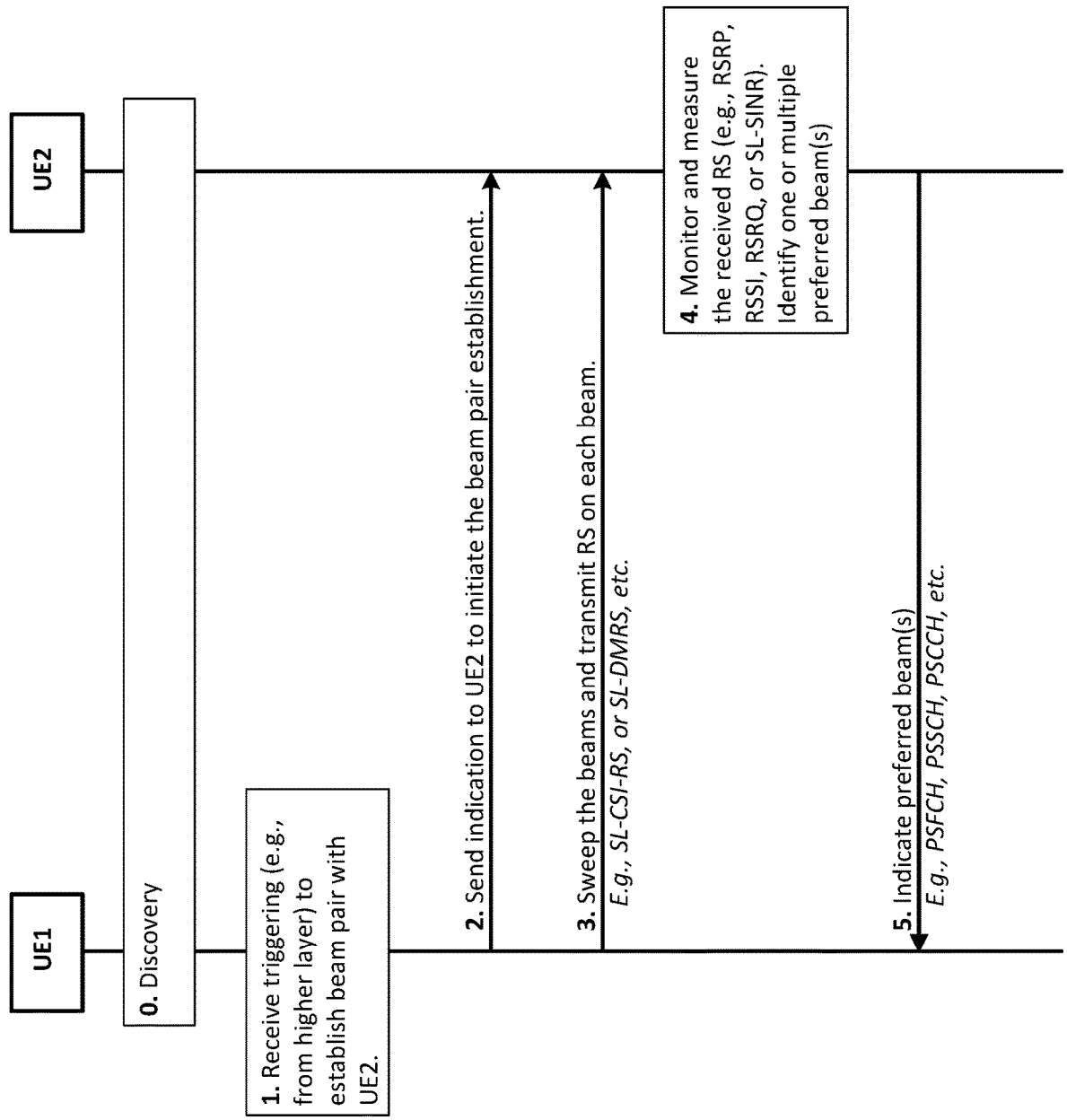
FIG. 6 is a call flow of an example procedure for UE initiated initial beam establishment at connection stage.

After two UEs finish the discovery procedure and set up the connection, one of the UE may initiate to establish beam pair link. A high-level overview of initiating the initial beam establishment procedure is depicted in FIG. 6, which may contain the following steps:

Step 0 of FIG. 6 is discovery. Two UEs (UE1 and UE2) perform discovery procedure on the sidelink and set up connection.

Step 1 is the triggering of beam establishment. A UE, e.g., UE1, may receive a trigger of establishing beam pair link with the other UE, e.g., UE2. The trigger may be an indication sent by the higher layer based on certain quality of service (QoS) requirement.

Step 2 is initiate beam establishment. UE1 may initiate the initial beam pair link establishment procedure with UE2. For example, UE1 may send an initial beam pair link establishment indicator to UE2 to initiate the procedure.

Such indication may be a reference signal, e.g., SL-DMRS for SCI transmitted on the PSCCH; or may be a sidelink control information; or may be the data transmitted on the PSSCH, e.g., MAC-CE. The indication may also contain other information related to the beam sweeping such as: time domain and frequency domain resources used for the beam sweeping, RS configuration, etc.

Since UE1 may already have established other connection with UE2, e.g., this connection may be a connection in frequency range 1 (FR1) using omnidirectional antenna or using very wide beam; or this connection may be a connection in frequency range 2 (FR2) using very wide beam, etc., UE1 may send the indication and schedule, for example, in one of three ways.

Figure 7A:
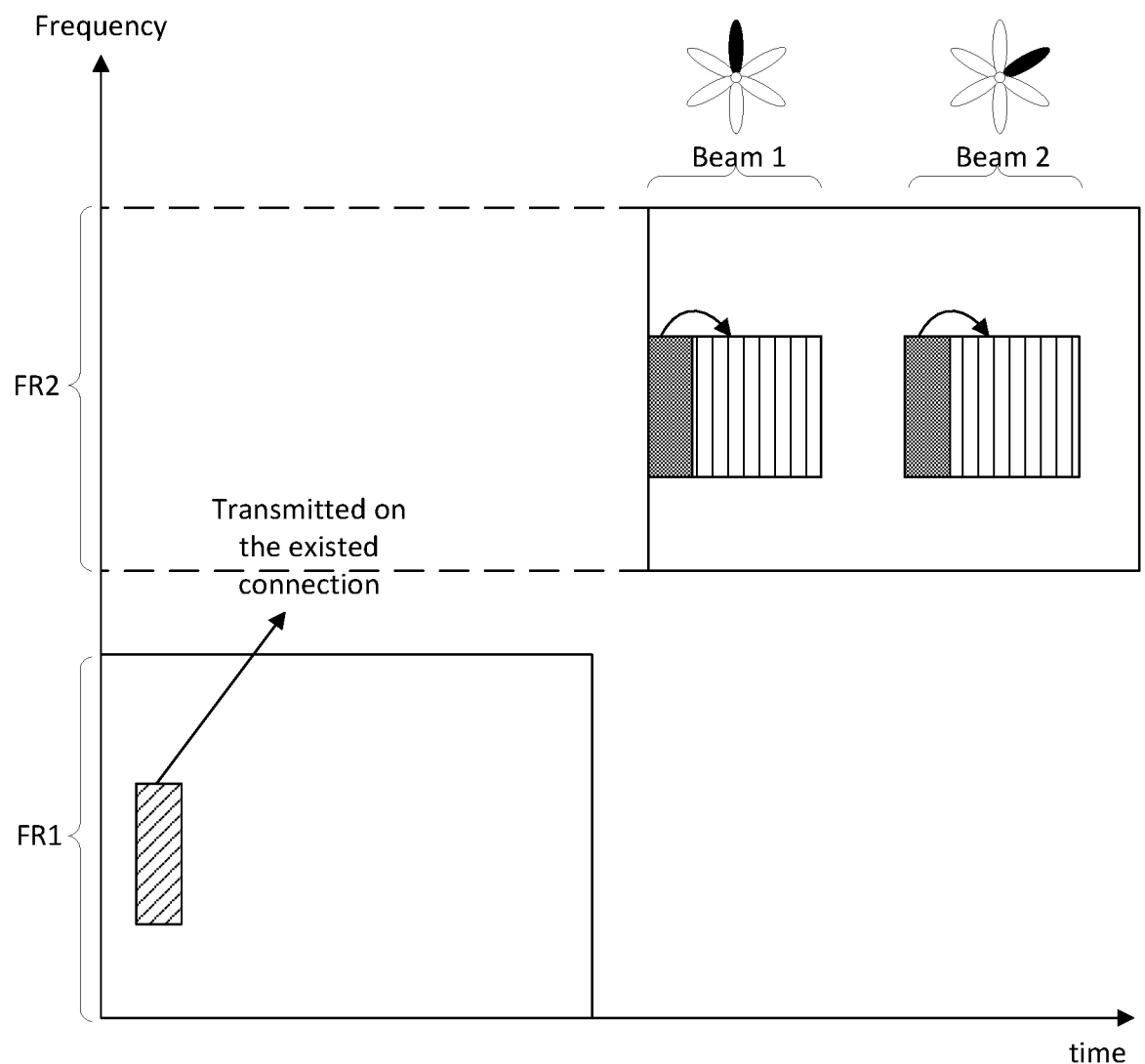
FIG. 7A shows an example of initiating the beam pair establishment and scheduling the beam sweeping with sending the initiating indication in FR1 and schedule the beam sweeping in FR2.

First is indication on FR1 and scheduling on FR2, whereby UE1 may send the indication on the established connection, e.g., in FR1, and may send the schedule of the beam sweeping in FR2. Then UE1 sweeps the beams as scheduled. An example is shown in FIG. 7A. In this case, UE1 may use different signaling to transmit such indication and the scheduling for beam sweeping.

Figure 7B:
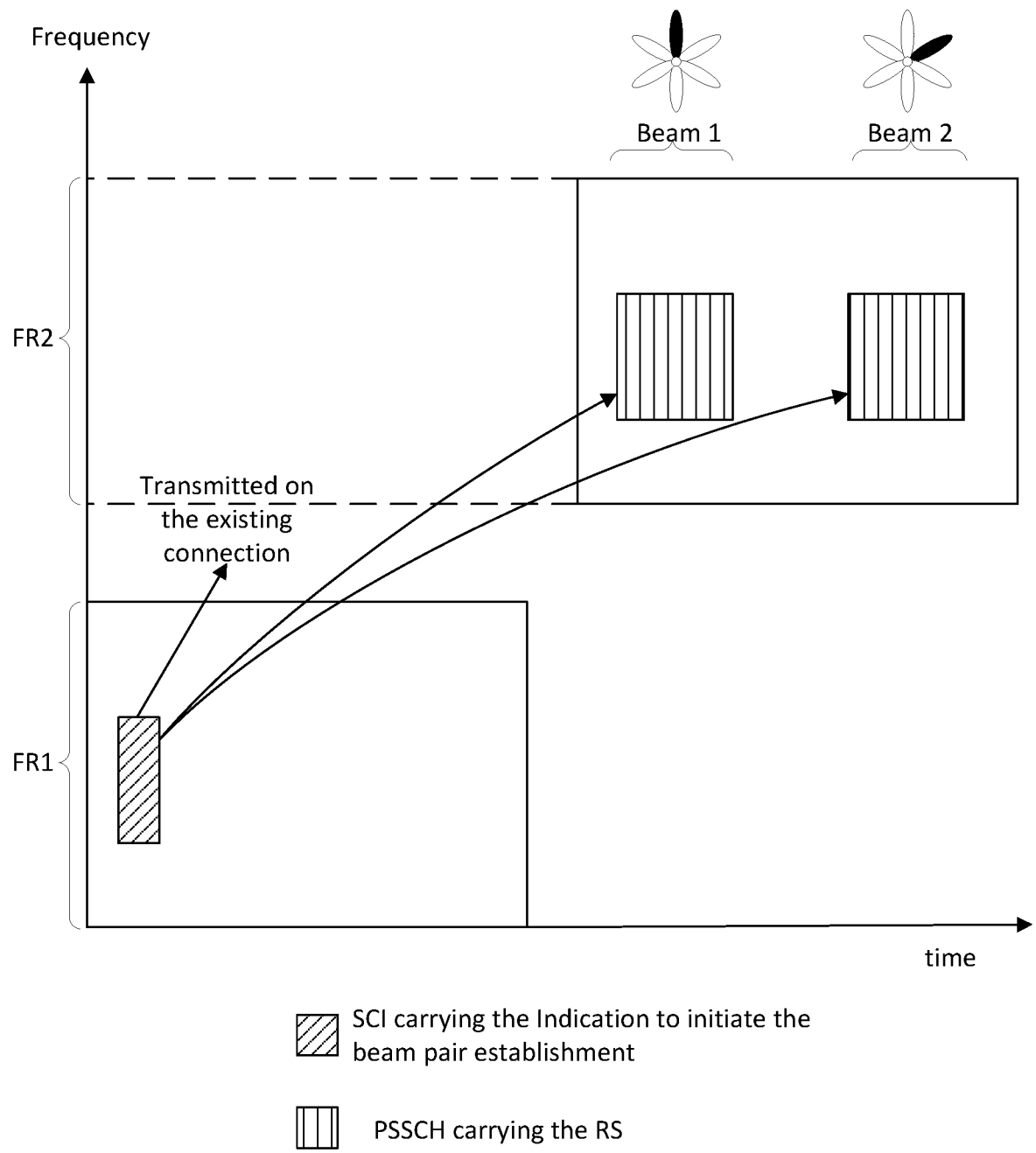
FIG. 7B shows an example of initiating the beam pair establishment and scheduling the beam sweeping with sending the initiating indication and schedule the beam sweeping in FR1.

Second is indication and scheduling on FR1, whereby UE1 may send the indication and the schedule of the beam sweeping on the established connection e.g., in FR1. Then UE1 sweeps the beams as scheduled. An example is shown in FIG. 7B. For example, such indication may be transmitted together with the SCI scheduling the beam sweeping. Such indication may be carried by the SCI or may be carried by the DMRS for the SCI.

Figure 7C:
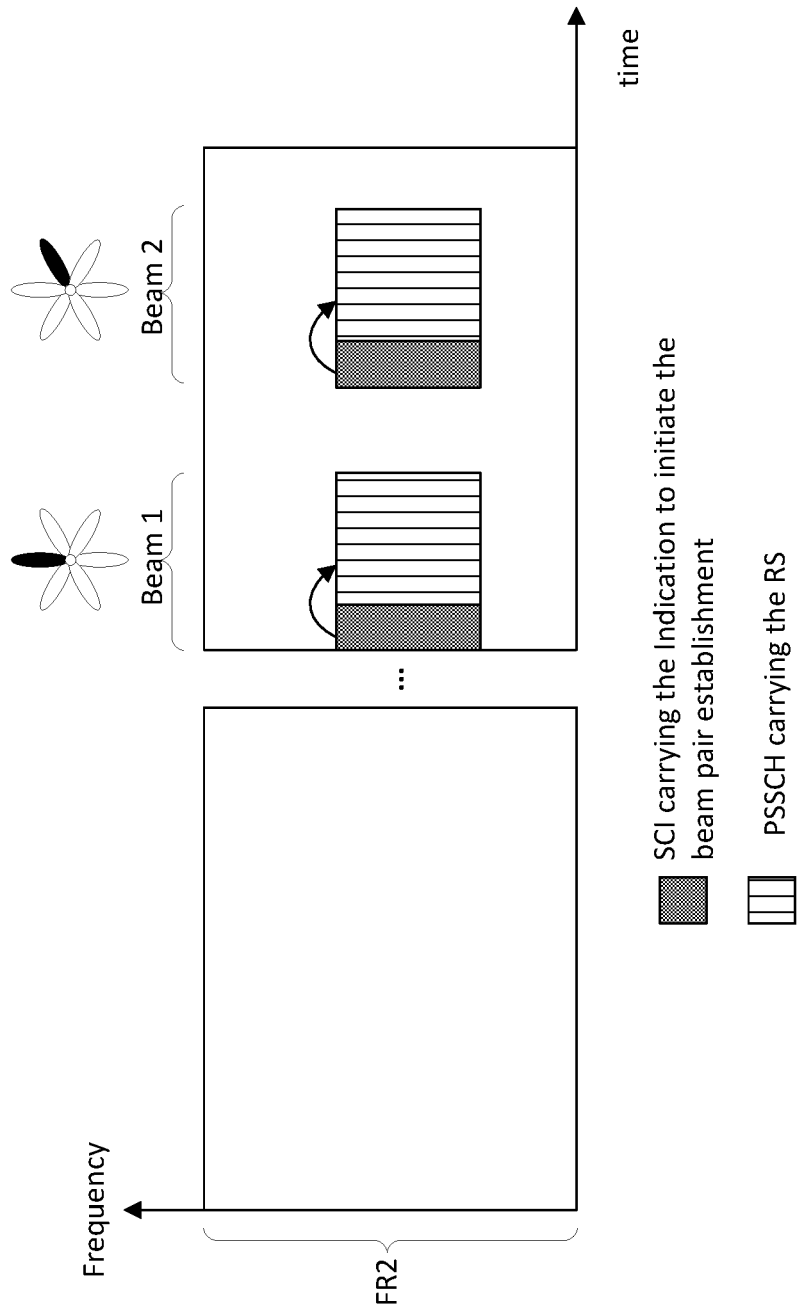
FIG. 7C shows an example of initiating the beam pair establishment and scheduling the beam sweeping with sending the initiating indication and schedule the beam sweeping in FR2.

Third is indication and scheduling on FR2, whereby UE1 may send the indication and the schedule of the beam sweeping in FR2. Then UE1 sweeps the beams as scheduled. An example is shown in FIG. 7C. For example, such indication may be transmitted together with the SCI scheduling the beam sweeping. Such indication may be carried by the SCI or may be carried by the DMRS for the SCI.

Step 3 is initial beam sweeping. UE1, may sweep the beams and transmit RS on each beam, where the RS may be a SL-CSI-RS, or a SL-DMRS.

The RS may be transmitted standalone, e.g., standalone SL-CSI-RS, where the RS does not need to be transmitted together with a data.

The RS may be transmitted with data or sidelink control information, e.g., SL-CSI-RS, SL-DMRS. In another word, when UE1 does not have data or sidelink control information to transmit, it cannot transmit the RS. For example, the RS may be transmitted together with regular data or dummy data, etc., on the physical sidelink shared channel (PSSCH). The RS may also be transmitted with the SCI on the PSCCH, e.g., SL-DMRS for PSCCH.

Different from the synchronization procedure and the discovery procedure, where the UE may sweep the beams to all the directions, UE1 may only sweep the beams within a range. UE1 may determine such range using the information of UE2 from the higher layer, e.g., location, direction, angle, relative speed, etc., extracted from the sensor, camera, etc.

Step 4 is measuring and identifying the preferred beam(s). UE2 monitors and measures the received RS. UE2 identify the preferred beam(s) based on the measurement results. For example, UE2 may measure the RSRP, or the RSRQ, or the L1-SINR of the received RS. UE2 may identify one preferred beam, e.g., the beam on which the RS having the best measurement result is transmitted. Or UE2 may identify multiple preferred beams and form a preferred beam list. The measurement result of the identified beam(s) should be higher than a threshold, e.g., $Q_{thresh}$, otherwise, UE2 may claim no preferred beam is identified.

Step 5 is indicating the identified beam(s), whereby UE2 indicates the identified preferred beam or beam list to UE1. Based on the response provided by UE2, UE1 may form one or multiple initial beam pair links with UE2.

Reporting the Preferred Beam

After UE2 measures the RS on each beam, UE2 may identify the preferred beam and notify UE1, reporting at connection stage or connectionless stage.

For reporting at connection stage, when UE1 and UE2 try to establish beam pair link, they may already have established other connection, e.g., connection in FR1 communicating through omni direction or wide beams. In this case, UE2 may send the response to UE1 using the existing connection. For example, UE1 may sweep the beam with RS in FR2 and UE2 may indicate the preferred beam to UE1 through connection in FR1.

For reporting at connectionless stage, UE2 may indicate the preferred beam to UE1 through FR2. This may applicable to the case when there is no other available connection between UE1 and UE2. In this case, UE1 may sweep the beam with RS in FR2 and UE2 may indicate the preferred beam to UE1 in FR2 as well.

In the beam sweeping, UE2 may identify one or multiple preferred beam(s).

The contents of the response sent from UE2 to UE1 may indicate preferred beam(s) only. For example, UE2 may indicate the beam ID/index, or the RS port number, or the RS configuration ID/index, or the transmission configuration indicator (TCI) state of the prefer beam to UE1. UE2 may only indicate one preferred beam in the response sent to UE1, e.g., indicate the beam with the best measurement result. Or UE2 may indicate multiple preferred beams in the response sent to UE1, e.g., UE2 may indicate k beam indexes to UE1 with a decrement order of the beam condition.

The contents of the response sent from UE2 to UE1 may indicate preferred beam(s) and the corresponding measurement result. For example, UE2 may indicate the beam index of the prefer beam and the corresponding RSRP or RSRQ value to UE1. UE2 may indicate one or multiple preferred beam(s) to UE1. When UE2 reports multiple preferred beams, UE2 may indicate the absolute value of the measurement results for each beam in the reporting. Or UE2 may indicate the absolute value of the measurement result for the best beam and the difference from a beam to the best beam for the rest beams in the reporting.

UE2 may indicate the preferred beam to UE1 explicitly by sending the response carrying the preferred beam information. UE2 may also indicate the preferred beam to UE1 implicitly by performing sidelink transmission to UE1 using the selected beam.

The UE2 may indicate the preferred beam to UE1 using physical sidelink feedback channel (PSFCH), PSSCH, or PSCCH.

For reporting on PSFCH, the response carrying the preferred beam(s) may be transmitted on the PSFCH. For example, through the sidelink feedback control information (SFCI); or the DMRS for the SFCI, e.g., the preferred beam information may be carried by the DMRS port and/or DMRS sequence of the DMRS transmitted on the PSFCH.

For reporting on PSSCH, the response carrying the preferred beam(s) may be transmitted on the PSSCH. For example, through MAC PDU; or the DMRS for PSSCH, e.g., the preferred beam information may be carried by the DMRS port and/or DMRS sequence of the DMRS transmitted on the PSSCH.

For reporting on PSCCH, the response carrying the preferred beam(s) may be transmitted on the PSCCH. For example, through the field in the SCI; or the DMRS for SCI, e.g., the preferred beam information may be carried by the DMRS port and/or DMRS sequence of the DMRS transmitted on the PSCCH.

Preferred Beam Reporting Using UE1 Reserved Resources:

In NR V2X mode 2, a UE need to sense the channel and reserve the resources before the transmission. In one approach, the resources used by UE2 to transmit the response to UE1 may be reserved by UE1. When UE1 reserve the resource for beam sweeping, it may also reserve the resources for UE2 to send the response.

Figure 8A:
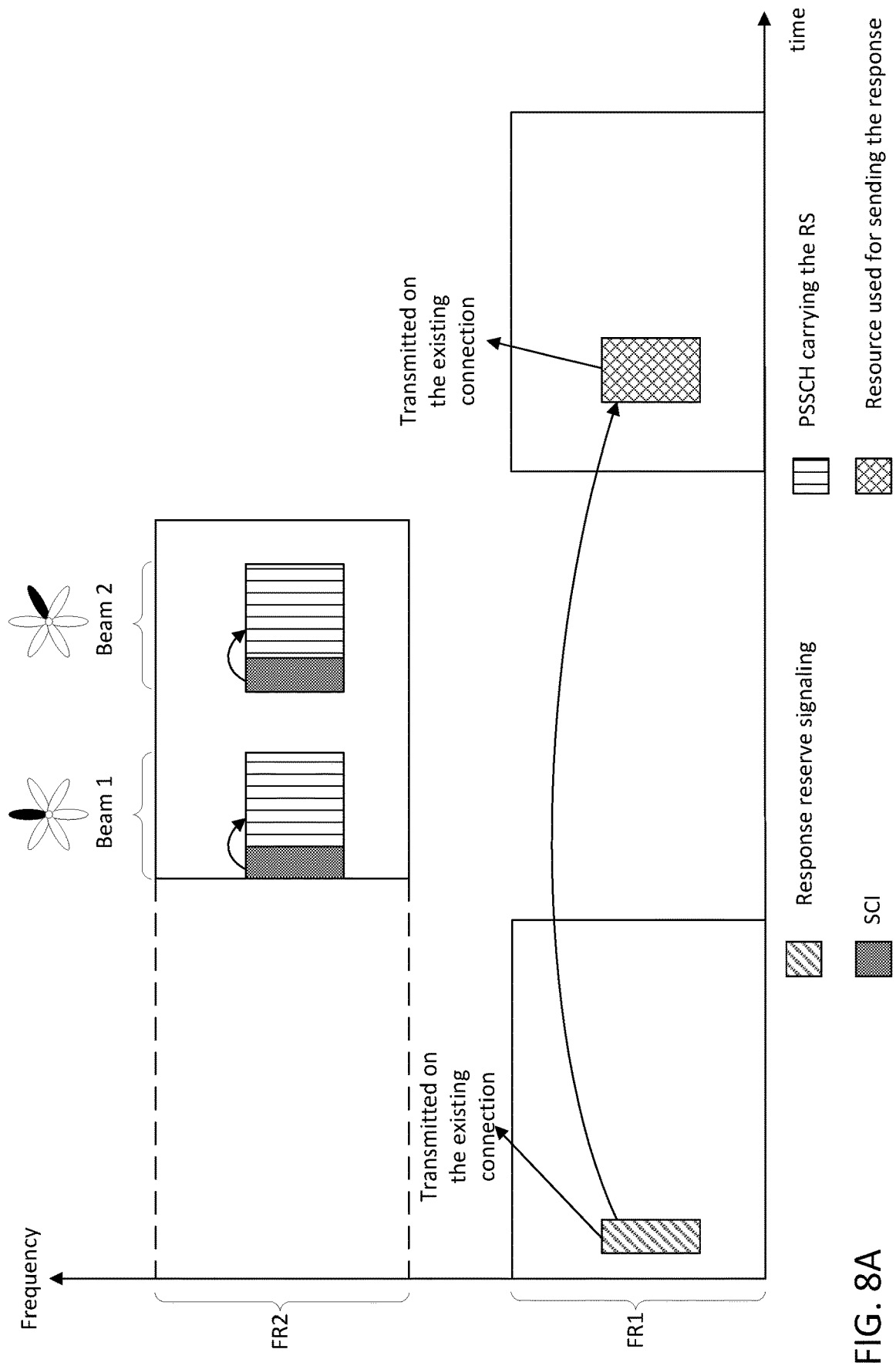
FIG. 8A shows an example where UE1 sends the reserve signaling in FR1 and UE2 sends the response in FR1 with separate reserve signalings for beam sweeping and responding.
Figure 8B:
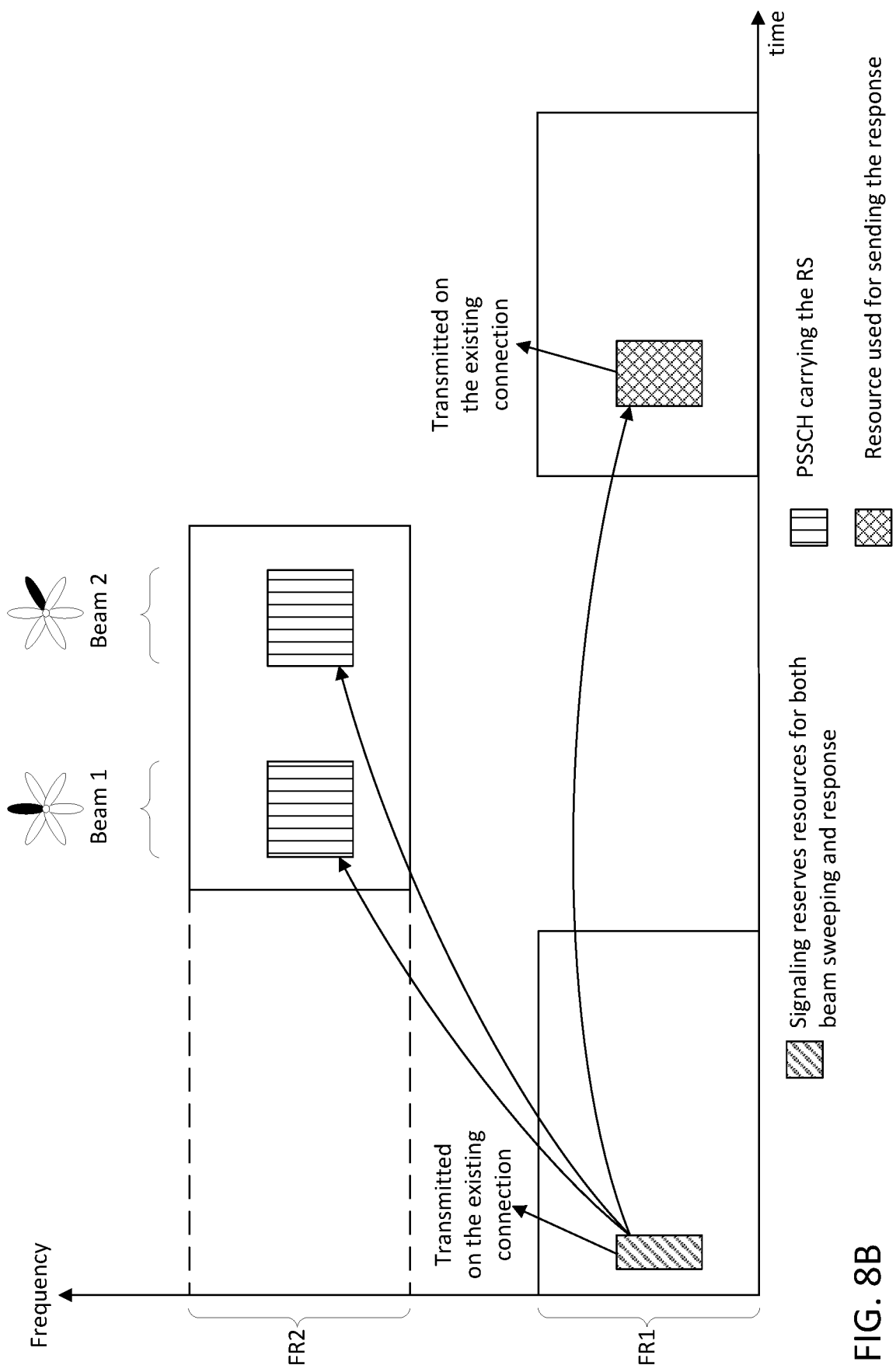
FIG. 8B shows an example where UE1 sends the reserve signaling in FR1 and UE2 sends the response in FR1 with same reserve signaling for beam sweeping and responding.

UE1 may reserve the resources through reserve signaling on FR1 and the reporting is sent on FR1 by UE2, whereby UE1 may send the reserve signaling, e.g., scheduling SCI, on the existing connection, e.g., in FR1, and reserved the resources for sending the response on the existing connection, e.g., in FR1, as shown in FIGS. 8A and 8B. UE1 may use different signalings to reserve the recourses used for beam sweeping and the resources used for sending the response as shown in FIG. 8A. UE1 may use one signaling to reserve the resources used for beam sweeping and the resources used for sending the response as shown in FIG. 8B. UE2 may indicate the preferred beam index or the RS port number associate with the preferred beam in the response to allow UE1 to figure out the preferred beam.

Figure 9:
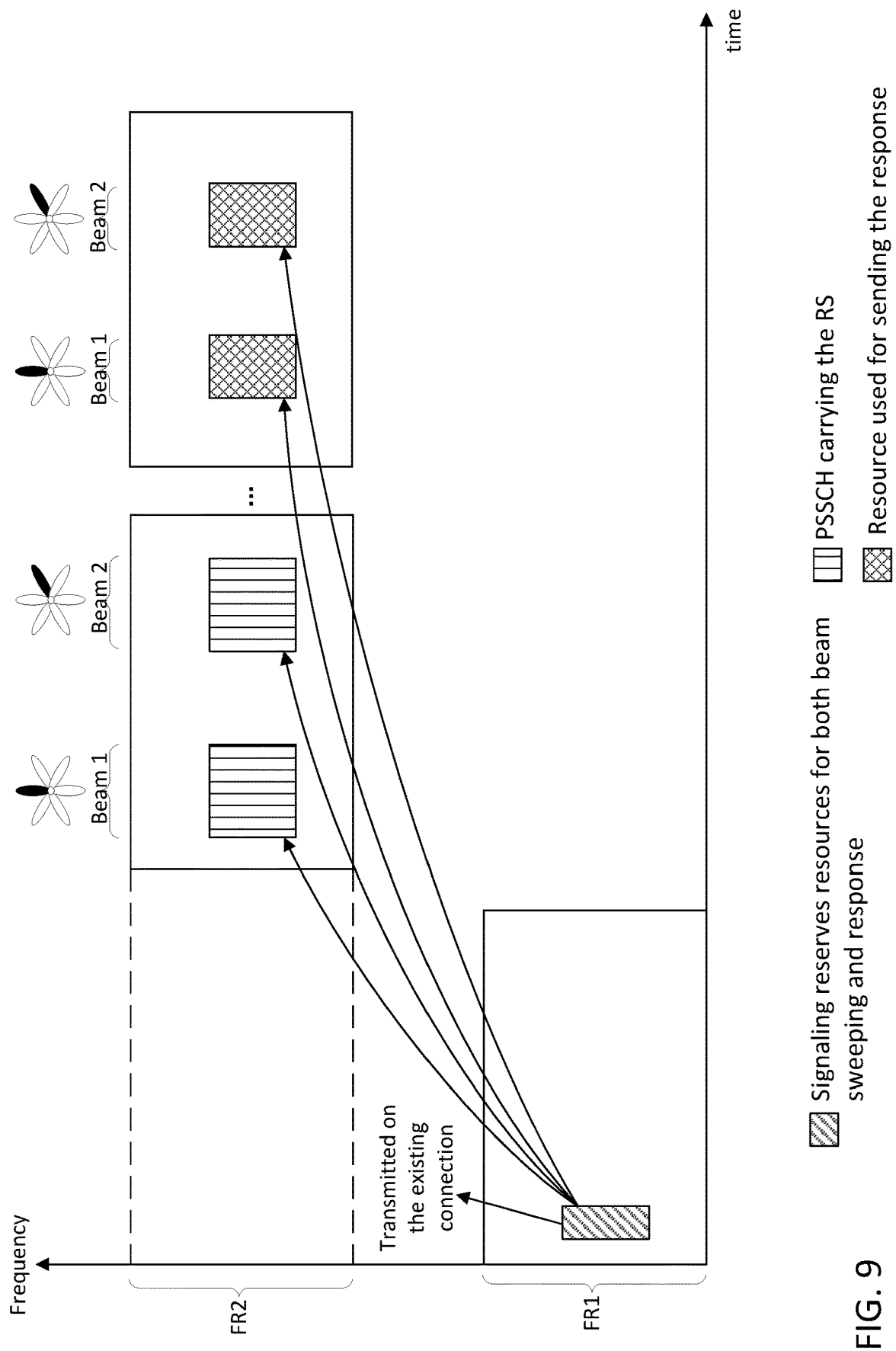
FIG. 9 shows an example where UE1 sends the reserve signaling in FR1 and UE2 sends the response in FR2.

Alternatively, UE1 may reserve the resources through reserve signaling sent on FR1 and the reporting is sent on FR2 by UE2. UE1 may send the reserve signaling, e.g., scheduling SCI, on the existing connection, e.g., in FR1, and reserved the resources for sending the response in FR2 as shown in FIG. 9. UE1 may reserve multiple resources where each resource may be associated with one beam. When UE2 identifies the preferred beam, it may send response on the resource associated with the preferred beam. UE1 may figure out the preferred beam by detecting response on the associated reserved resource.

Figure 10:
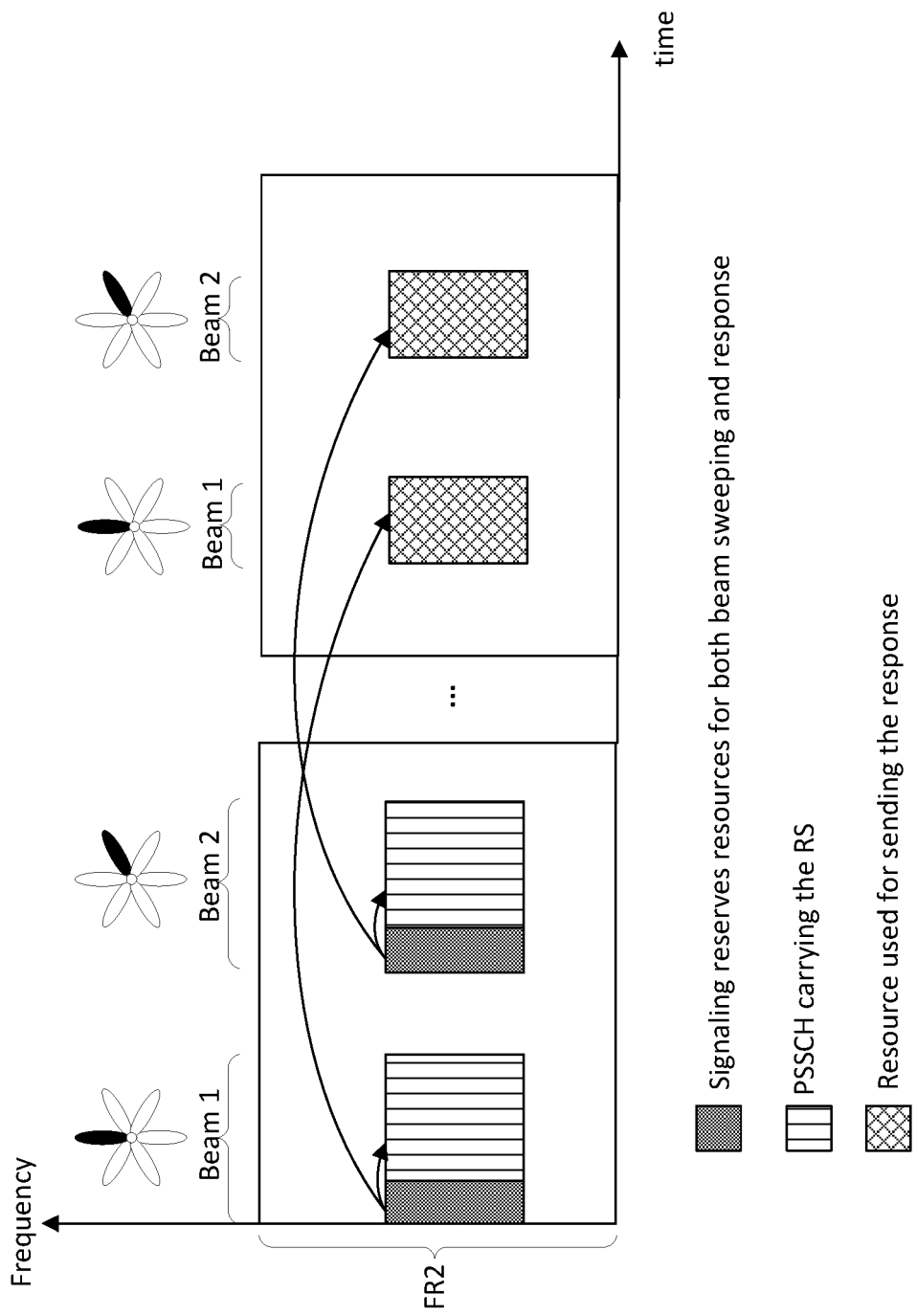
FIG. 10 shows an example where UE1 sends the reserve signaling in FR2 and UE2 send the response in FR2.

Further, UE1 may alternatively reserve the resources through reserve signaling on FR2 and the reporting is sent on FR2 by UE2. UE1 may send the reserve signaling, e.g., scheduling SCI, in FR2, and reserved the resources for sending the response in FR2 as shown in FIG. 10. UE1 may reserve multiple resources where each resource may be associated with one beam. When UE2 identifies the preferred beam, it may send response on the resource associated with the preferred beam. UE1 may figure out the preferred beam by detecting response on the associated reserved resource.

Figure 11:
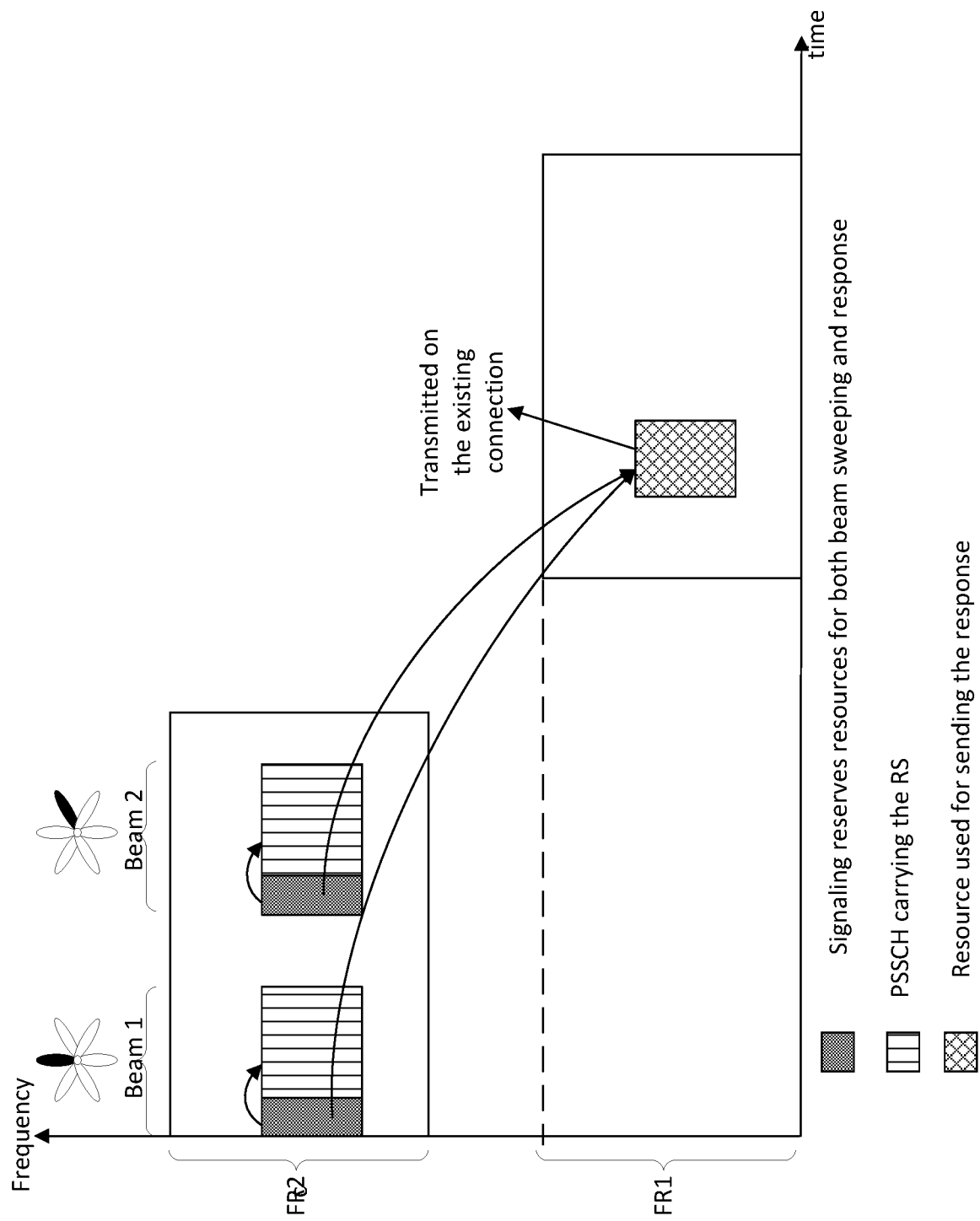
FIG. 11 shows an example where UE1 sends the reserve signaling in FR2 and UE2 send the response in FR1.

Also, UE1 may alternatively reserve the resources through reserve signaling sent on FR2 and the reporting is sent on FR1 by UE2. UE1 may send the reserve signaling, e.g., scheduling SCI, in FR2, and reserved the resources for sending the response on the existing connection, e.g., in FR1, as shown in FIG. 11. For example, the same resource may be associated with different beam sweeping in the FR2. UE2 may indicate the preferred beam index or the RS port number associate with the preferred beam in the response to allow UE1 to figure out the preferred beam.

Preferred Beam Reporting Scheduled by UE2

In another approach, the resources used by UE2 to transmit the response to UE1 may be reserved by UE2. For example, UE1 may only reserve the resources for beam sweeping. After UE2 measures the RS and identifies the preferred beam, UE2 may reserve a transmission, e.g., using SCI, to send the response to UE1 as shown in FIG. 12. The UE2 may reserve the transmission of the response in several ways.

Figure 12A:
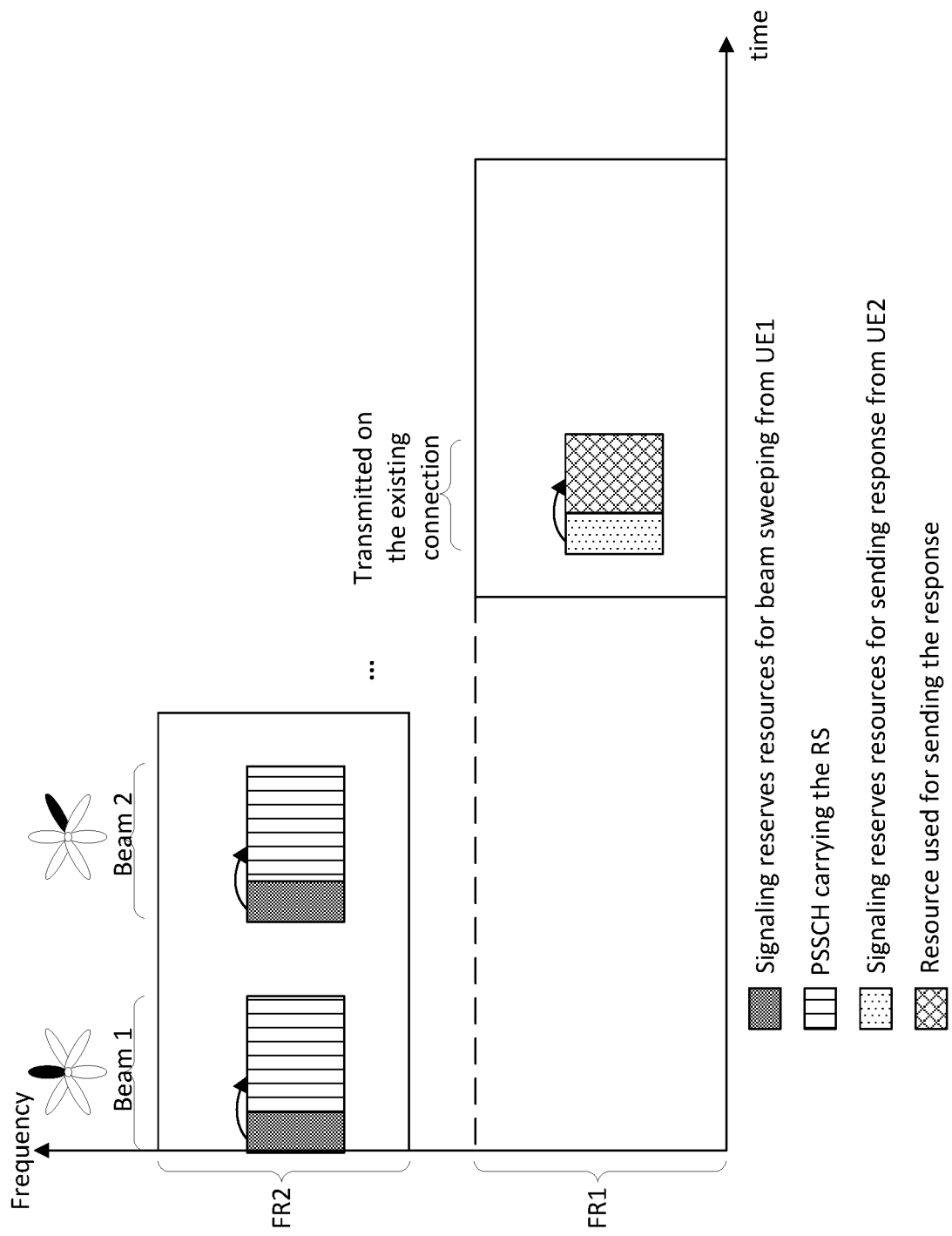
FIG. 12A shows an example where UE2 sends the reserve signaling and sends the response in FR1.

First, UE2 may schedule the reporting on FR1. UE2 may reserve the resource and transmit the response on the existing connection, e.g., in FR1, as shown in FIG. 12A. UE2 may indicate the preferred beam index or the RS port number associate with the preferred beam in the response to allow UE1 to figure out the preferred beam.

Figure 12B:
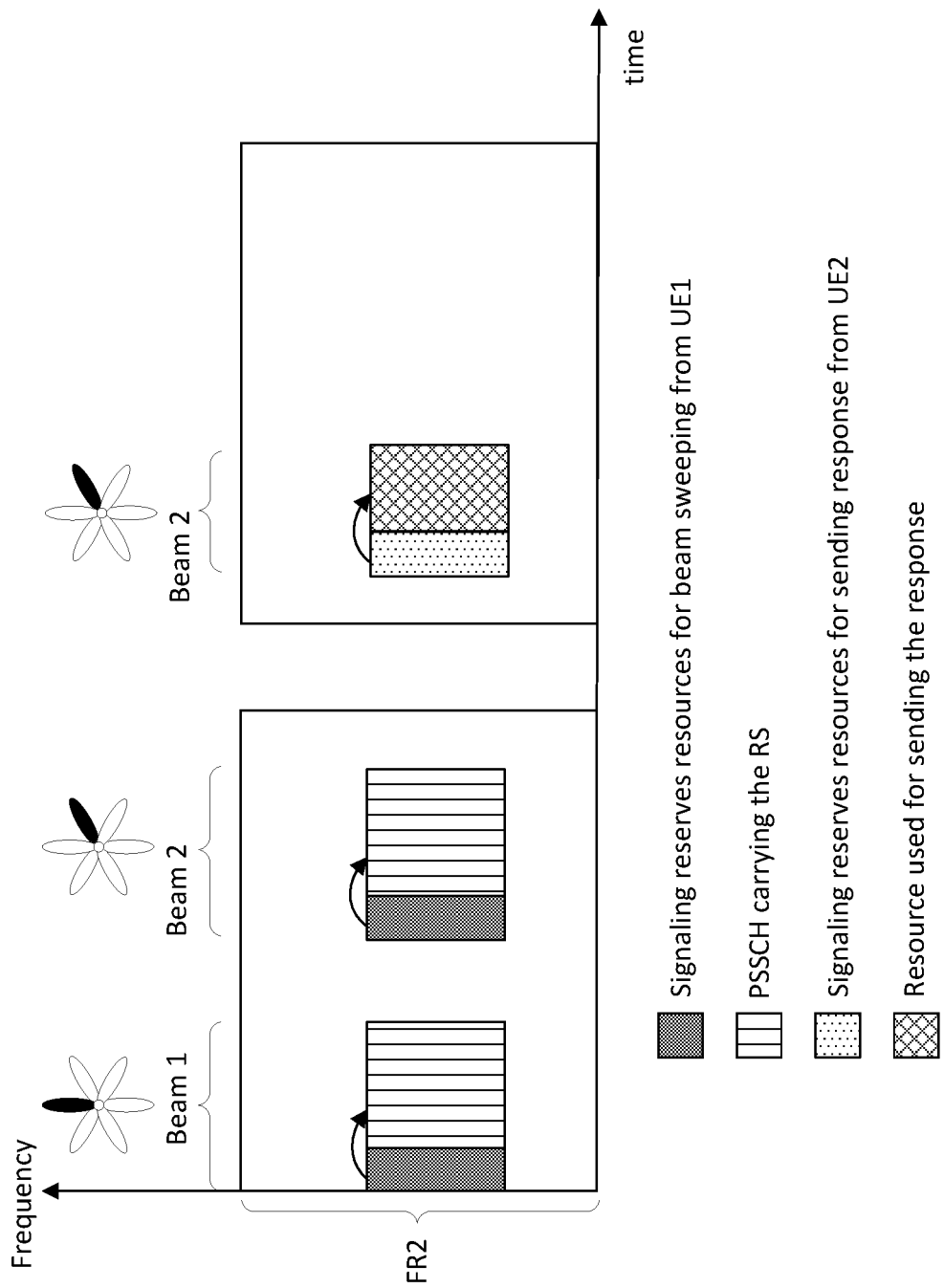
FIG. 12B shows an example where UE2 sends the reserve signaling and sends the response in FR2.

Second, UE2 may schedule the reporting on FR2, whereby UE2 reserves the resource and transmit the response on the preferred beam as shown in FIG. 12B. For example, assume UE2 identifies beam 2 is the best beam, then UE2 may reserve the resource and transmit the response on beam 2. UE1 may figure out beam 2 is the preferred beam by detecting response.

Beam Refinement in NR V2X Mode 2

After UE1 and UE2 establish the initial beam pair link, they may perform beam refinement procedure to further improve the beam condition, e.g., fine tune the beams to make them better aligned. In this section, two schemes on the beam refinement procedure are elaborated.

Beam Refinement at Both UE Sides

In one approach, the beam refinement procedure may happen at both UE sides. A high-level overview of the beam refinement procedure at both UE sides is depicted in FIG. 13.

Figure 13:
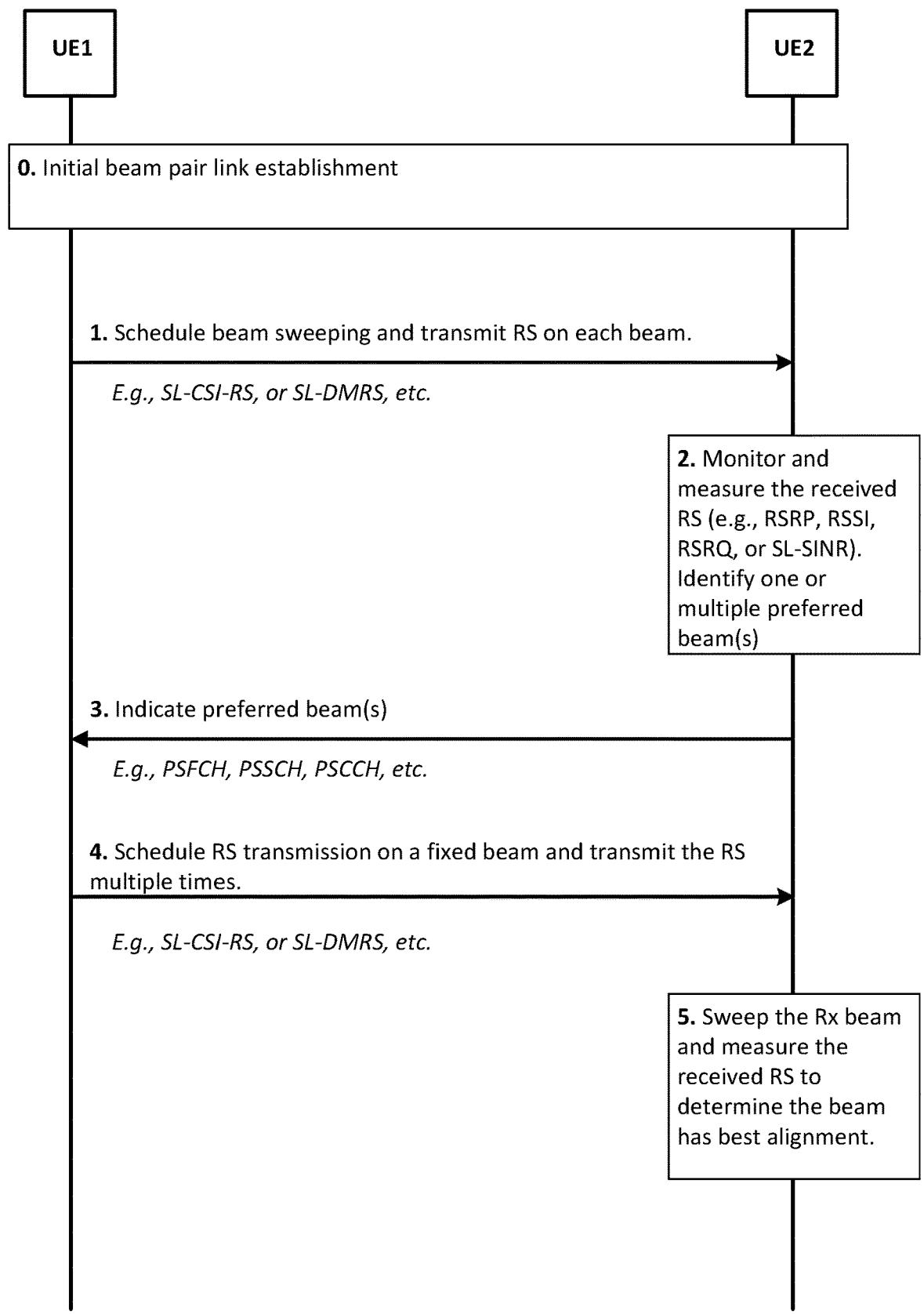
FIG. 13 is a call flow of an example procedure of beam refinement at both UE sides.

Step 0 of FIG. 13 is initial beam establishment. UE1 and UE2 perform initial beam establishment. After this procedure, UE1 receives indication from UE2 with one or multiple preferred beam(s). For example, UE1 may be indicated with beam k as the preferred beam.

Step 1 is finer beam sweeping at UE1 side. With the information of the initial beam sweeping, e.g., the beam width, the angle rotated between each beam, etc.; and the information of the preferred beam indicated by UE2, e.g., beam k in this example, UE1 may perform another round of finer beam sweeping around beam k with one or more of the following alternatives.

First is finer beam sweeping with narrower beams. UE1 may form beams with narrower beam width comparing to the one used in the initial beam sweeping and sweep them.

Second is finer beam sweeping with smaller rotation angle. Assume in initial beam sweeping, the beam is rotated by $\theta_{init}$ degree each time. In the finer beam sweeping, UE1 may rotate the beam by $\theta_{finer}$ degree, where $\theta_{finer} < \theta_{init}$, between each beam transmission.

Third is finer beam sweeping with a smaller sweeping range. In the initial beam sweeping, UE1 may sweep the beam in $\alpha_{init}$ degree range, e.g., $\alpha_{init}=360$. In the finer beam sweeping, UE1 may sweep the beam with a smaller range. For example, UE1 may sweep the beam in $\alpha_{finer}$ degree range around the direction of the preferred beam k, where $\alpha_{finer} < \alpha_{init}$.

Fourth is finer beam sweeping with a smaller number of swept beams. Assume UE1 sweeps the beam in K directions in the initial beam sweeping, in the finer beam sweeping, UE1 may only sweep the beam in N directions, where N<K.

The ideas proposed for the RS used for initial beam sweeping may be also applied here. For example, the RS may be SL-CSI-RS or may be SL-DMRS. The RS may be transmitted standalone, or the RS may be transmitted with data or sidelink control information.

Step 2 of FIG. 13 is measuring and identifying the preferred beam(s). UE2 monitors and measures the received RS. UE2 identifies the preferred beam(s) based on the measurement results. The ideas proposed for measuring the RS in initial beam establishment may be also applied here. For example, UE2 may measure the RSRP, RSRQ, or the L1-SINR of the received RS. UE2 may identify one or multiple beam(s) as the preferred beam(s). The measurement result of the identified beam(s) should be higher than a threshold, e.g., $Q_{thresh}$, otherwise, UE2 may claim no preferred beam is identified.

Step 3 is indicating the identified beam(s). UE2 indicates the identified preferred beam or beam list to UE1. The ideas proposed for reporting the preferred beam in initial beam establishment may be also applied here. For example. UE2 may explicit indicate the preferred beam or UE2 may implicit indicate the preferred beam. UE2 may indicate the preferred beam to UE1 using PSFCH, using PSSCH or using PSCCH. UE2 may indicate the preferred beam to UE1 through an existing connection, e.g., connection in FR1; or through the identify beam.

Figure 14A:
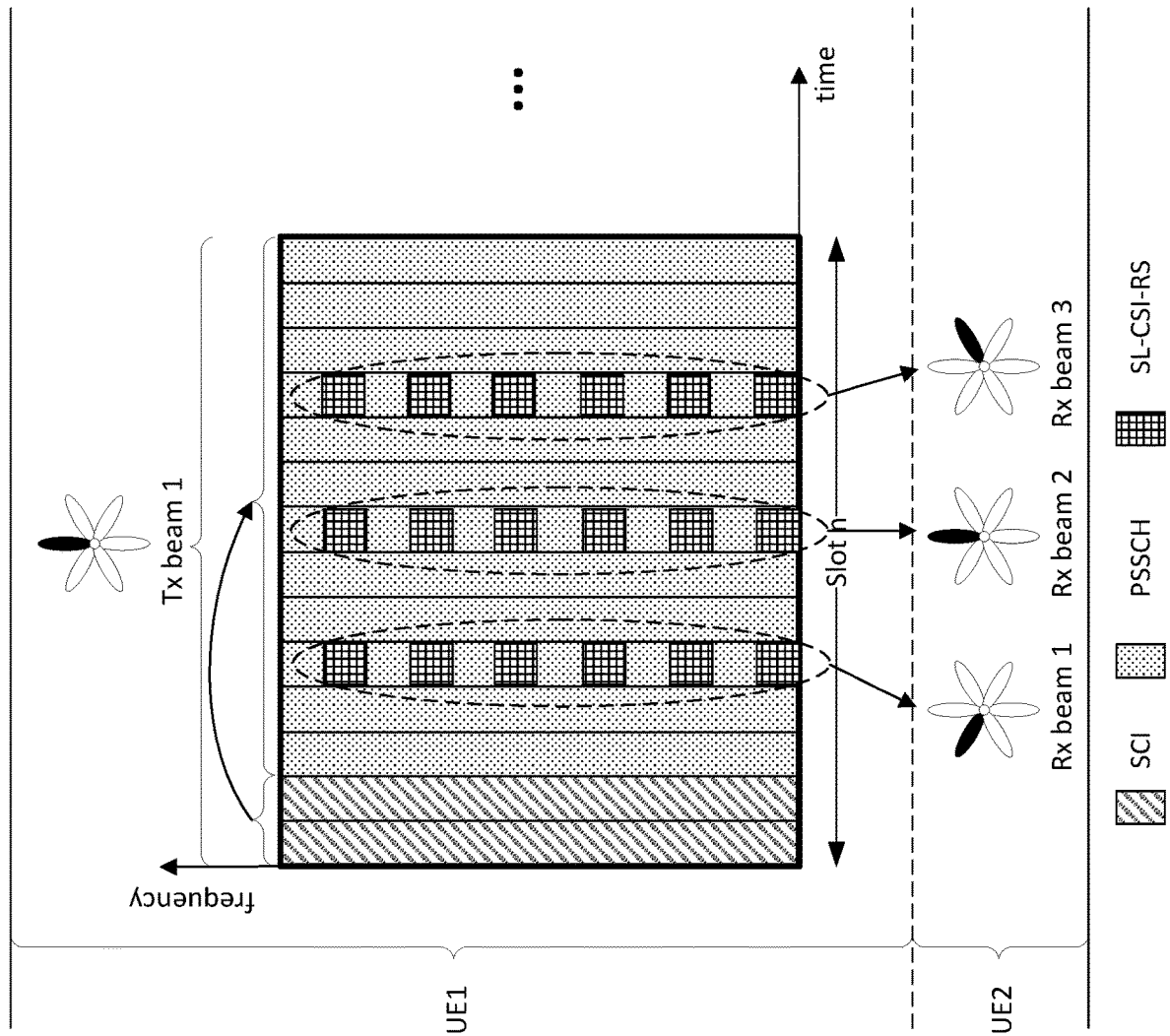
FIG. 14A illustrates an example of beam repeating for beam refinement at Rx UE side where one SCI schedules multiple RS transmissions.
Figure 14B:
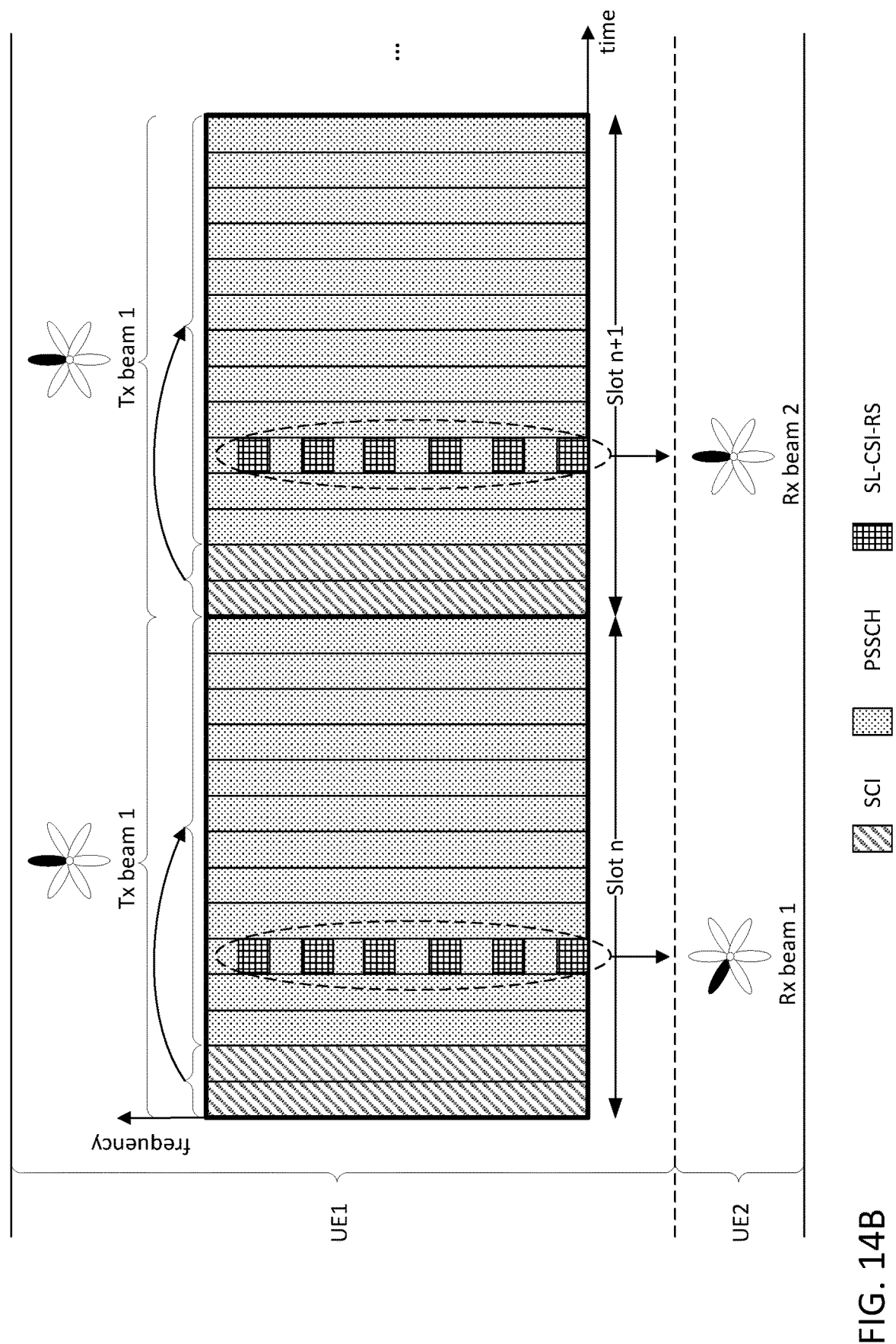
FIG. 14B illustrates an example of beam repeating for beam refinement at Rx UE side where one SCI schedules one RS transmission.

Step 4 is repeating the beam at UE1 side. UE1 may fix the beam as the preferred beam indicated by UE2 and transmit the RS multiple times on it. When UE1 is indicated with multiple preferred beams, UE1 may autonomously select one and transmit the RS multiple times on it. Like the beam sweeping, the RS may be SL-CSI-RS or may be SL-DMRS. The RS may be transmitted standalone, or the RS may be transmitted with data or sidelink control information. UE 1 may schedule one sidelink transmission which contains multiple RS transmission as shown in FIG. 14A; or UE 1 may schedule multiple sidelink transmissions where each one may contain one RS transmission as shown in FIG. 14B. In the figure, SL-CSI-RS is used as the example to be transmitted for beam refinement. The RS may also be the SL-DMRS as another option.

Step 5 is beam refinement at UE2 side. UE2 may sweep its beam and measure the RS transmitted by UE1 using the same beam. UE2 may determine the beam having the best measurement result as the beam having alignment with UE1. UE2 may use the determined best beam to communicate with UE1, e.g., receiving data from UE1 and/or transmitting data to UE1.

Beam Refinement at UE2 Side Only

In another approach, to reduce the complexity of the beam refinement procedure, thereby reducing the latency, the beam refinement procedure may happen only at UE2 side. A high-level overview of the beam refinement procedure at UE2 side only is depicted in FIG. 15.

Figure 15:
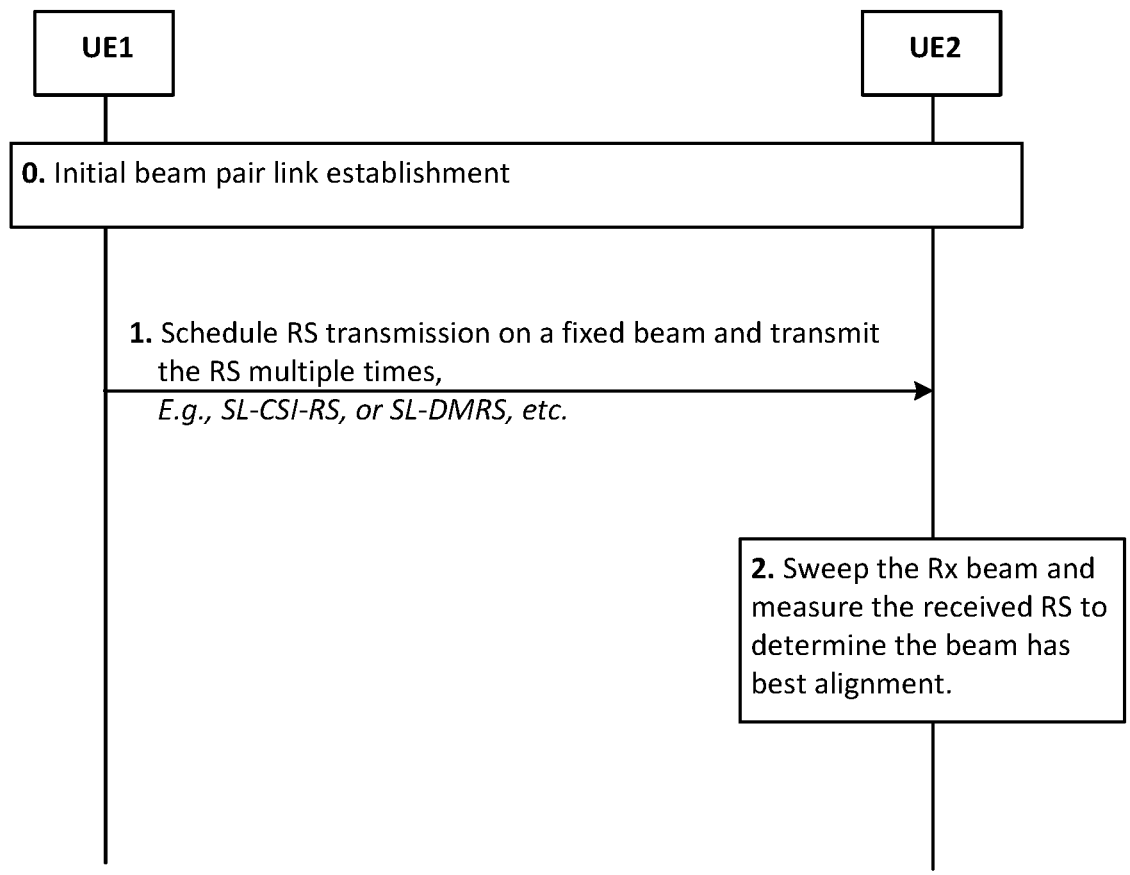
FIG. 15 is a call flow of an example procedure for beam refinement at the Rx UE side only.

Step 0 of FIG. 15 is initial beam establishment. UE1 and UE2 perform initial beam establishment. After this procedure, UE1 is indicated by UE2 with one or multiple preferred beam(s). For example, UE1 may be indicated with beam k as the preferred beam.

Step 1 is repeating the beam at UE1 side. UE1 may fix k beam as the Tx beam and transmit the RS multiple times on it. When UE1 is indicated with multiple preferred beams, UE1 may autonomously select one and transmit the RS multiple times on it. Like the beam sweeping, the RS may be SL-CSI-RS or may be SL-DMRS. The RS may be transmitted standalone, or the RS may be transmitted with data or sidelink control information.

Step 2 is beam refinement at UE2 side. UE2 may sweep its beam and measure the RS transmitted by UE1 using the same beam. UE2 may determine the beam having the best measurement result as the beam having alignment with UE1. UE2 may use the determined best beam to communicate with UE1, e.g., receiving data from UE1 and/or transmitting data to UE1.

Beam Forming and Management in NR V2X Mode 1

In NR V2X mode 1, sidelink communication is controlled by the gNB. When two UEs (UE1 and UE2), e.g., two vehicular UEs, or one vehicular UE and one non-vehicular UE etc., want to form beam pair to conduct sidelink communication, gNB controlled beam forming procedure may be conducted.

When a UE, e.g., UE1 wants to establish beam pair link with other UE within the proximity, the beam forming may be conducted at either connectionless stage or connection stage. For example, UE1 may form the beam with a known UE, e.g., UE2, which may have already established some connection with UE1. In this case, the beamforming may be conducted at connection stage. For another example, UE1 may form the beam with an unknown UE, e.g., any UE x within the proximity, which may have not established any connection with UE1. In this case, the beamforming may be conducted at connection stage.

Figure 16:
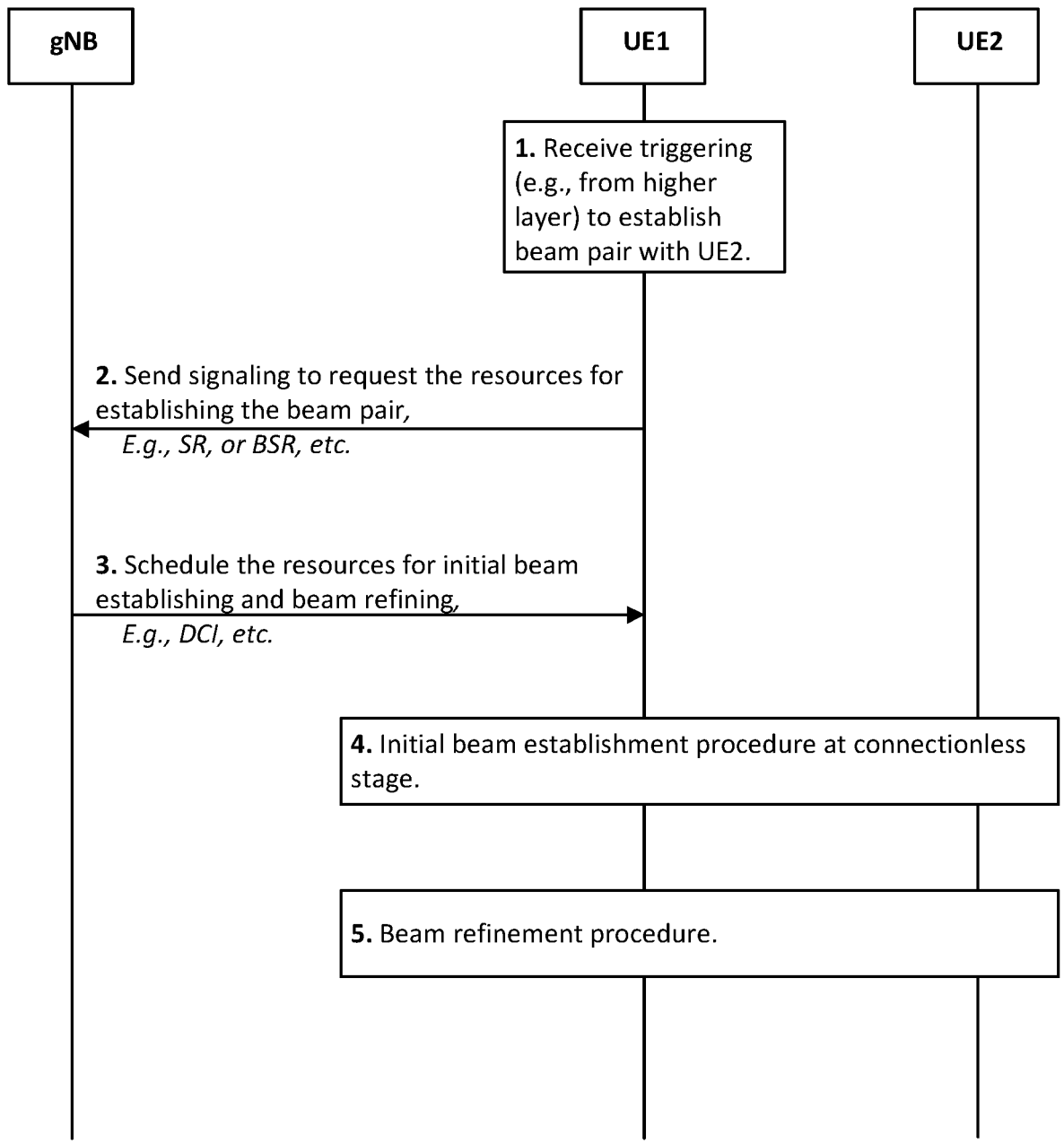
FIG. 16 is a call flow of an example procedure for gNB controlled beam forming at connectionless stage procedure with joint scheduling of initial beam establishment and fine tuning.

GNB Controlled Beam Forming at Connectionless Stage with Joint Scheduling of Initial Beam Establishment and Fine Tuning A high-level overview of the gNB controlled beam forming procedure at connectionless stage is depicted in FIG. 16.

Step 1 of FIG. 16 is the triggering of beam establishment. A UE, e.g., UE1, may receive a trigger to, or may want to establish beam pair link with an unknown UE. The trigger may be an indication sent by the higher layer based on certain quality of service (QoS) requirement.

Step 2 is requesting a resource from a gNB. UE1 may send a signaling to gNB to request the resources, e.g., PSCCH, PSSCH, and/or PSFCH, for establishing the beam pair with UE2. For example, the signaling may be a scheduling request (SR) or may be a buffer status report (BRS), etc.

In step 3, the gNB schedules the resources for initial beam establishing and beam refinement. gNB may schedule the resources on sidelink used by UE1 and UE2 to establish the initial beam and further refine the beam through DCI. The DCI may schedule multiple transmissions on the sidelink, where are used for establishing the initial beam and further refining the beam separately. Since UE1 is in connectionless stage, gNB may only send the scheduling DCI to the Tx UE (UE1). Then UE1 may forward the scheduled sidelink transmission to another UE using SCI.

Step 4 is initial beam establishment at connectionless stage. UE1 may conduct the initial beam establishment procedure with UE2 using the resources scheduled by the gNB. The ideas proposed for establishing the initial beam in V2X mode 2 at connectionless stage may be also applied here.

Step 5 is beam refinement. UE1 may conduct the beam refinement procedure with UE2 using the resources scheduled by the gNB. The ideas proposed for refining beam in V2X mode 2 may be also applied here.

Figure 17A:
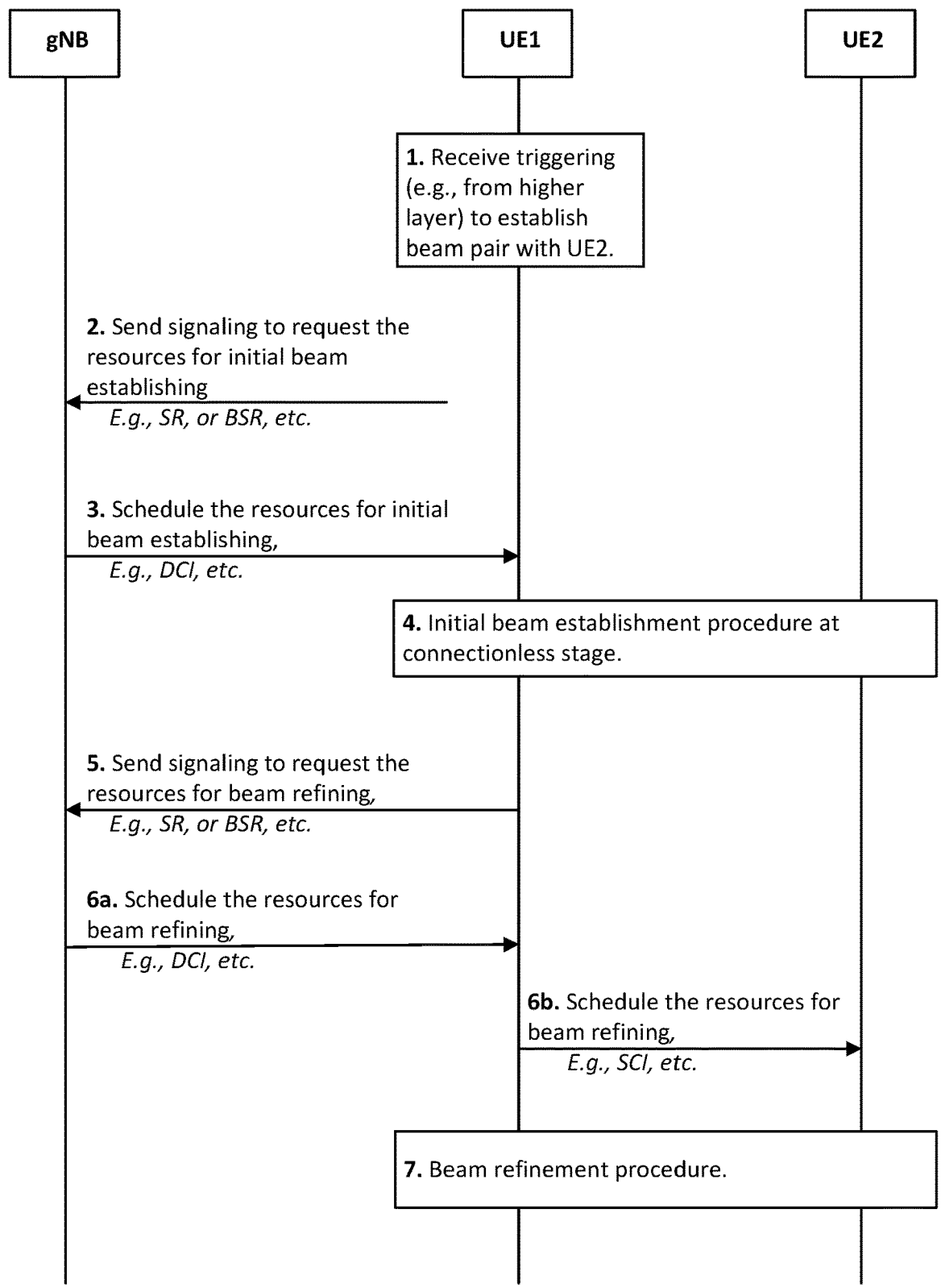
FIG. 17A is a call flow of an example procedure for gNB controlled beam forming at connectionless stage procedure with separate scheduling of initial beam establishment and fine tuning.
Figure 17B:
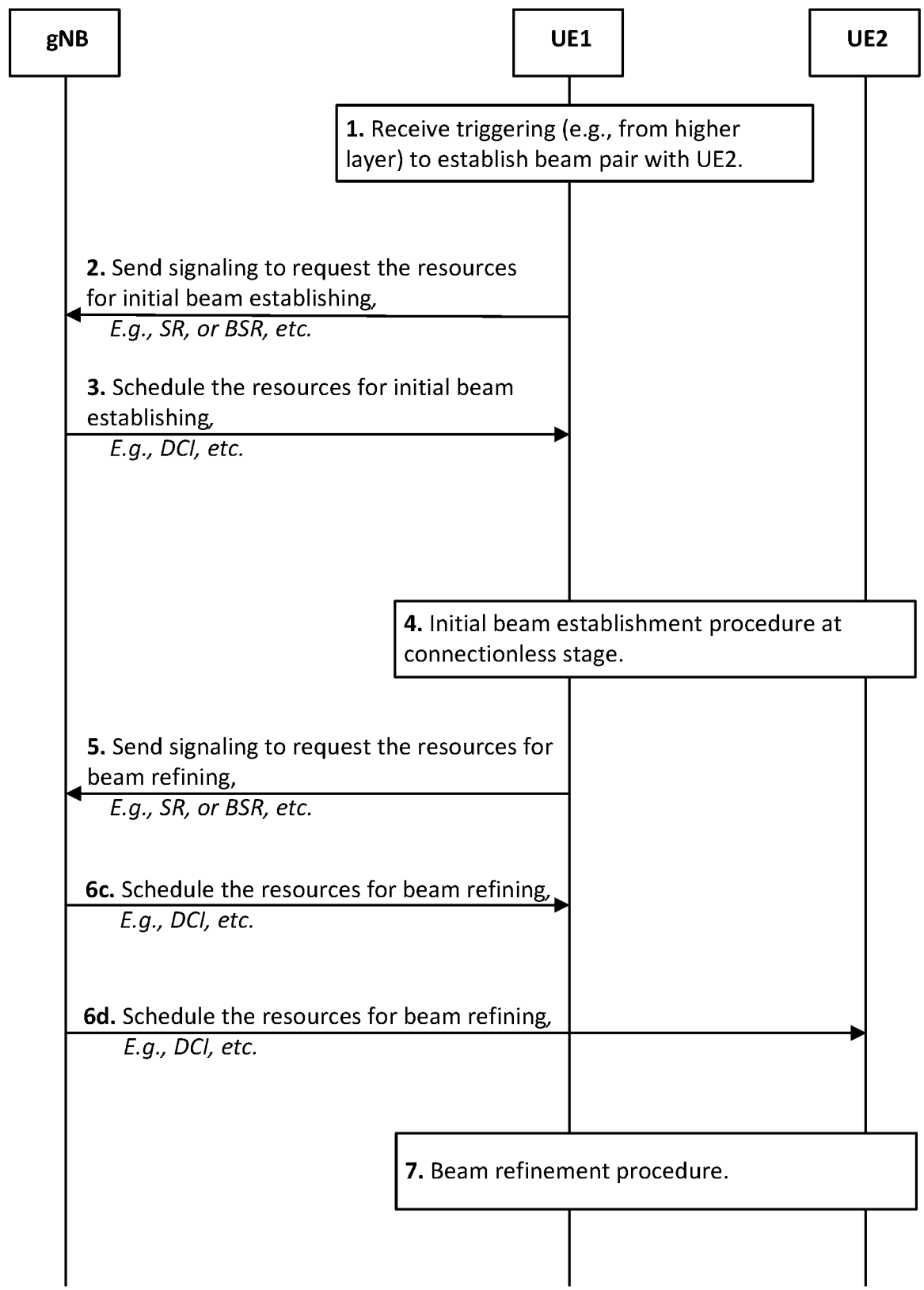
FIG. 17B is a call flow of an example procedure for gNB controlled beam forming at connectionless stage procedure with separate scheduling of initial beam establishment and fine tuning.

GNB Controlled Beam Forming at Connectionless Stage with Separate Scheduling of Initial Beam Establishment and Fine Tuning In another approach, another set of gNB controlled beam forming procedures at connectionless stage is depicted in FIGS. 17A and 17B. The examples of FIG. 17A and FIG. 17B vary at step 6.

In both FIG. 17A and FIG. 17B, step 1 is the triggering of beam establishment. A UE, e.g., UE1, may receive a trigger to or may want to establish beam pair link with an unknown UE, e.g., UE2. The trigger may be an indication sent by the higher layer based on certain quality of service (QoS) requirement.

Step 2 is a request for a resource from the gNB for initial beam establishment. UE1 may send a signaling to gNB to request the resources, e.g., PSCCH, PSSCH, and/or PSFCH, for establishing the initial beam pair with UE2. For example, the signaling may be a scheduling request (SR) or may be a buffer status report (BRS), etc.

In step 3, the gNB schedules the resources for initial beam establishment. The gNB may schedule the resources on sidelink used by UE1 and UE2 to establish the initial beam through DCI. Since UE1 is in connectionless stage, gNB may only send the scheduling DCI to the Tx UE (UE1). Then UE1 may forward the scheduled sidelink transmission to other UE(s) using SCI.

Step 4 is initial beam establishment. UE1 may conduct the initial beam establishment procedure with UE2 using the resources scheduled by the gNB. The ideas proposed for establishing the initial beam in V2X mode 2 (at connection stage and/or at connectionless stage) may be also applied here.

Step 5 is requesting a resource for beam refinement from the gNB. After establishing the initial beam pair link, UE1 may send a signaling to gNB to request the resources for further refining the beam with UE2. For example, the signaling may be a scheduling request (SR) or may be a buffer status report (BRS), etc.

The examples of FIG. 17A and FIG. 17B differ at step 6. In step 6a of FIG. 17A, the gNB schedules the resources for beam refinement and sends scheduling DCI to Tx UE only. gNB may schedule the resources on sidelink used by UE1 and UE2 to further refine the beam through DCI. gNB may only send the scheduling DCI to the Tx UE (UE1).

In step 6b of FIG. 17A, the Tx UE forward the scheduled sidelink transmission to Rx UE using SCI. UE1 may forward the scheduled sidelink transmission to the Rx UE using SCI.

In steps 6c and 6d of FIG. 17B, the gNB schedules the resources for beam refinement and sends scheduling DCI to both Tx UE and Rx UE. gNB may schedule the resources on sidelink used by UE1 and UE2 to further refine the beam through DCI. gNB may send the scheduling DCI to both the Tx UE (UE1) and the Rx UE (e.g., UE2). Note: step 6c and step 6d may be conducted simultaneously, or step 6c may be conducted before step 6d, and vice versa.

Step 7 is beam refinement. Step 7 is the same in FIG. 17A and FIG. 17B. UE1 may conduct the beam refinement procedure with UE2 using the resources scheduled by the gNB. The ideas proposed for refining beam in V2X mode 2 may be also applied here.

Figure 18:
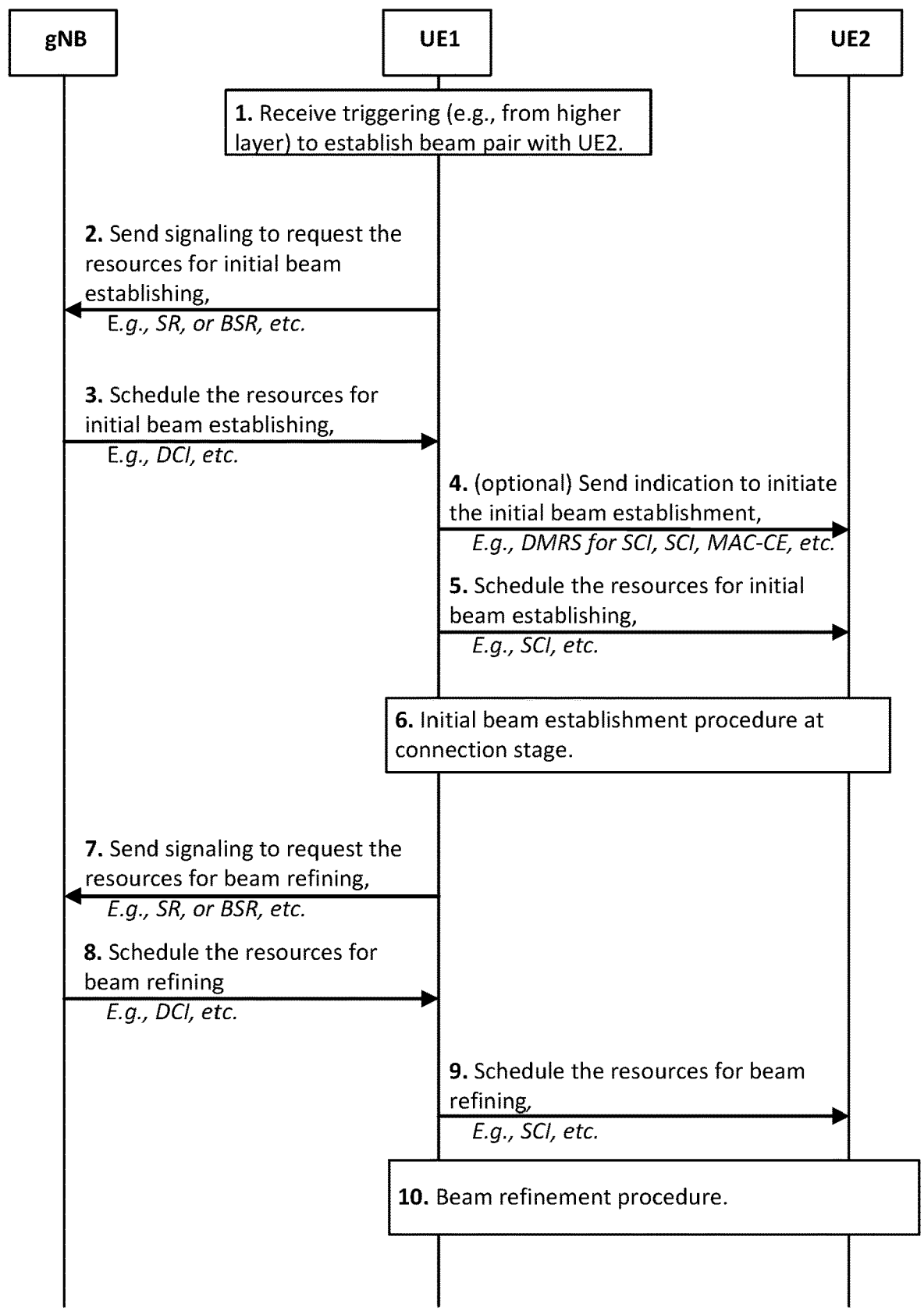
FIG. 18 is a call flow of an example procedure for gNB controlled beam forming procedure at connection stage with scheduling DCI transmitted to Tx UE only.

GNB Controlled Beam Forming at Connection Stage with Scheduling DCI Transmitted to TX UE Only A high-level overview of the gNB controlled beam forming procedure at connection stage with scheduling DCI transmitted to Tx UE only is depicted in FIG. 18.

Step 1 of FIG. 18 is the triggering of beam establishment. A UE, e.g., UE1, may receive a trigger to or may want to establish beam pair link with a known UE, e.g., UE2. The trigger may be an indication sent by the higher layer based on certain quality of service (QoS) requirement.

Step 2 is requesting a resource for initial beam establishment from the gNB. UE1 may send a signaling to gNB to request the resources, e.g., PSCCH, PSSCH, and/or PSFCH, for establishing the initial beam pair with UE2. For example, the signaling may be a scheduling request (SR) or may be a buffer status report (BRS), etc.

In step 3, the gNB schedules the resources for initial beam establishing and sends scheduling DCI to Tx UE only. The gNB may schedule the resources on sidelink used by UE1 and UE2 to establish the initial beam through DCI. gNB may send the scheduling DCI to the Tx UE (UE1) only.

Step 4 is the initiation of the beam establishment. Step 4 is optional. UE1 may initiate the initial beam pair link establishment procedure with UE2. For example, UE1 may send an initial beam pair link establishment indicator to UE2 to initiate the procedure.

In step 5, the Tx UE forwards the scheduled sidelink transmission for initial beam establishment to Rx UE using SCI. E1 may forward the scheduled sidelink transmission for initial beam establishment to the Rx UE using SCI.

Step 6 is initial beam establishment at connection stage. UE1 may conduct the initial beam establishment procedure with UE2 using the resources scheduled by the gNB. The ideas proposed for establishing the initial beam in V2X mode 2 at connection stage may be also applied here.

Step 7 is a request resource for beam refinement from gNB. After establishing the initial beam pair link, UE1 may send a signaling to gNB to request the resources for further refining the beam with UE2. For example, the signaling may be a scheduling request (SR) or may be a buffer status report (BRS), etc.

In step 8, the gNB schedules the resources for beam refinement and sends scheduling DCI to Tx UE only. The gNB may schedule the resources on sidelink used by UE1 and UE2 to further refine the beam through DCI. gNB may send the scheduling DCI to the Tx UE (UE1) only.

In step 9, the Tx UE forwards the scheduled sidelink transmission for beam refinement to the Rx UE using SCI. UE1 may forward the scheduled sidelink transmission for beam refinement to the Rx UE using SCI.

Step 10 is beam refinement. UE1 may conduct the beam refinement procedure with UE2 using the resources scheduled by the gNB. The ideas proposed for refining beam in V2X mode 2 may be also applied here.

The Proposed procedures here may be applied to the case when UE1 is under gNB's coverage while UE1 is out of gNB's coverage. The Proposed procedures here may be also applied to the case when both UE1 and UE2 are under gNB's coverage.

The procedure in FIG. 18 shows an example where the resources used for initial beam sweeping and for further fine tuning are separately scheduled by gNB using different DCIs. In another example, like FIG. 16, the resources used for initial beam sweeping and for further fine tuning may be jointly scheduled by gNB using one DCI.

Figure 19:
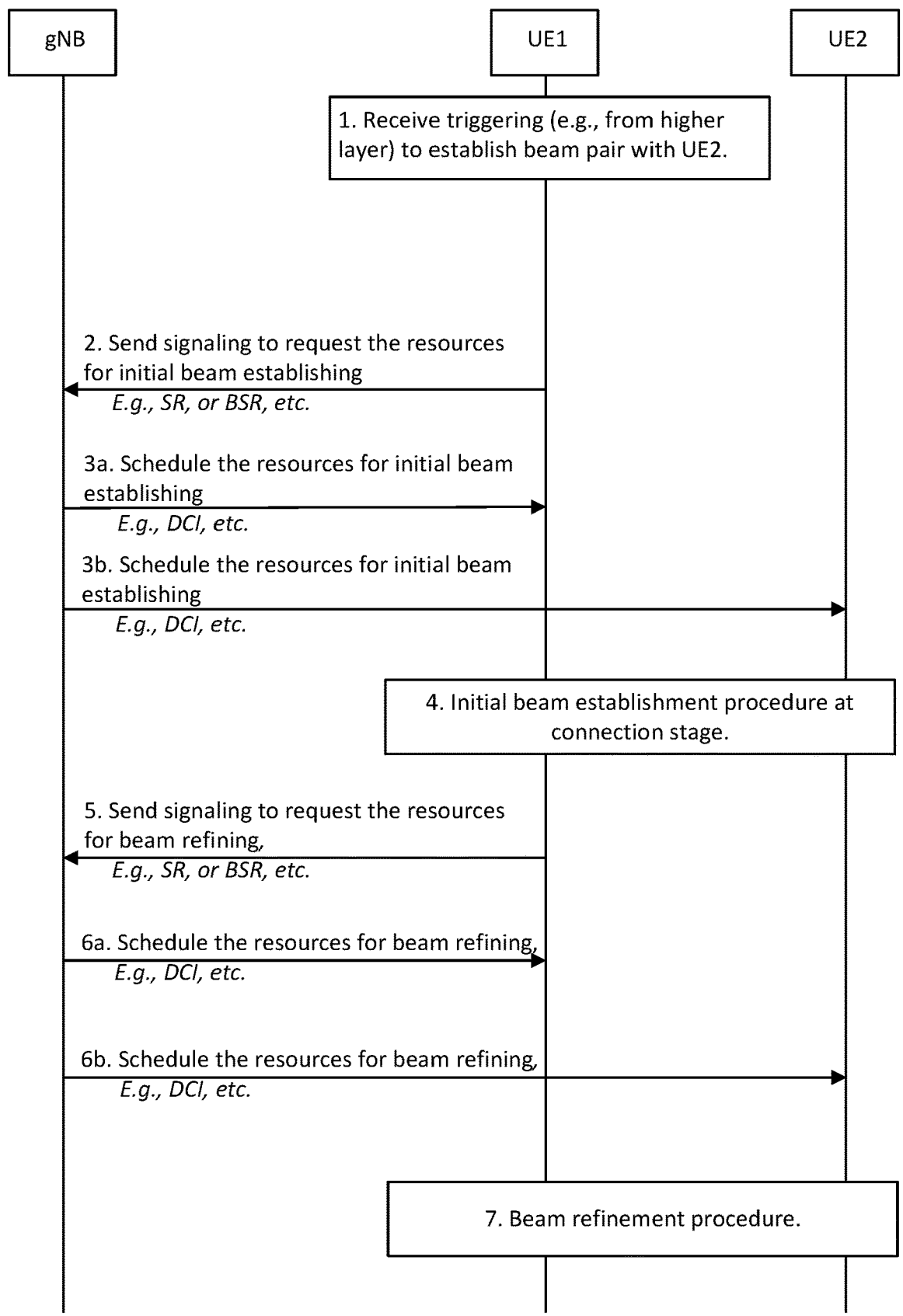
FIG. 19 is a call flow of an example procedure for gNB controlled beam forming procedure at connection stage with scheduling DCI transmitted to both Tx UE and Rx UE.

GNB Controlled Beam Forming at Connection Stage with Scheduling DCI Transmitted to Both TX UE and RX UE A high-level overview of the gNB controlled beam forming procedure at connection stage with scheduling DCI transmitted to both Tx UE and Rx UE is depicted in FIG. 19.

Step 1 of FIG. 19 is the triggering of beam establishment. A UE, e.g., UE1, may receive a trigger to or may want to establish beam pair link with a known UE, e.g., UE2. The trigger may be an indication sent by the higher layer based on certain quality of service (QoS) requirement.

Step 2 is a request resource for initial beam establishment from gNB. UE1 may send a signaling to gNB to request the resources, e.g., PSCCH, PSSCH, and/or PSFCH, for establishing the initial beam pair with UE2. For example, the signaling may be a scheduling request (SR) or may be a buffer status report (BRS), etc.

In step 3a and step 3b, the gNB schedules the resources for initial beam establishing and sends scheduling DCI to both Tx UE and Rx UE. The gNB may schedule the resources on sidelink used by UE1 and UE2 to establish the initial beam through DCI. gNB may send the scheduling DCI to both the Tx UE (UE1) and the Rx UE (e.g., UE2). Note: step 3a and step 3b may be conducted simultaneously, or step 3a may be conducted before step 3b, and vice versa.

Step 4 is initial beam establishment at connection stage. UE1 may conduct the initial beam establishment procedure with UE2 using the resources scheduled by the gNB. The ideas proposed for establishing the initial beam in V2X mode 2 at connection stage may be also applied here.

Step 5 is requesting a resource for beam refinement from the gNB. After establishing the initial beam pair link, UE1 may send a signaling to gNB to request the resources for further refining the beam with UE2. For example, the signaling may be a scheduling request (SR) or may be a buffer status report (BSR), etc.

In steps 6a and 6b, the NB schedules the resources for beam refinement and sends scheduling DCI to both Tx UE and Rx UE. The gNB may schedule the resources on sidelink used by UE1 and UE2 to further refine the beam through DCI. gNB may send the scheduling DCI to both the Tx UE (UE1) and the Rx UE (e.g., UE2). Note: step 6a and step 6b may be conducted simultaneously, or step 6a may be conducted before step 6b, and vice versa.

Step 7 is beam refinement. UE1 may conduct the beam refinement procedure with UE2 using the resources scheduled by the gNB. The ideas proposed for refining beam in V2X mode 2 may be also applied here.

The procedure in the example of FIG. 19 may be applied to the case when both UE1 and UE2 are under gNB's coverage.

The procedure in FIG. 19 shows an example where the resources used for initial beam sweeping and for further fine tuning are separately scheduled by gNB using different DCIs. In another example, like the example of FIG. 16, the resources used for initial beam sweeping and for further fine tuning may be jointly scheduled by gNB using one DCI.

Example Systems

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility.

The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive eCall, disaster alerts, real-time gaming, multi-person video calls, autonomous driving, augmented reality, tactile internet, virtual reality, home automation, robotics, and aerial drones to name a few. All of these use cases and others are contemplated herein.

Figure 20A:
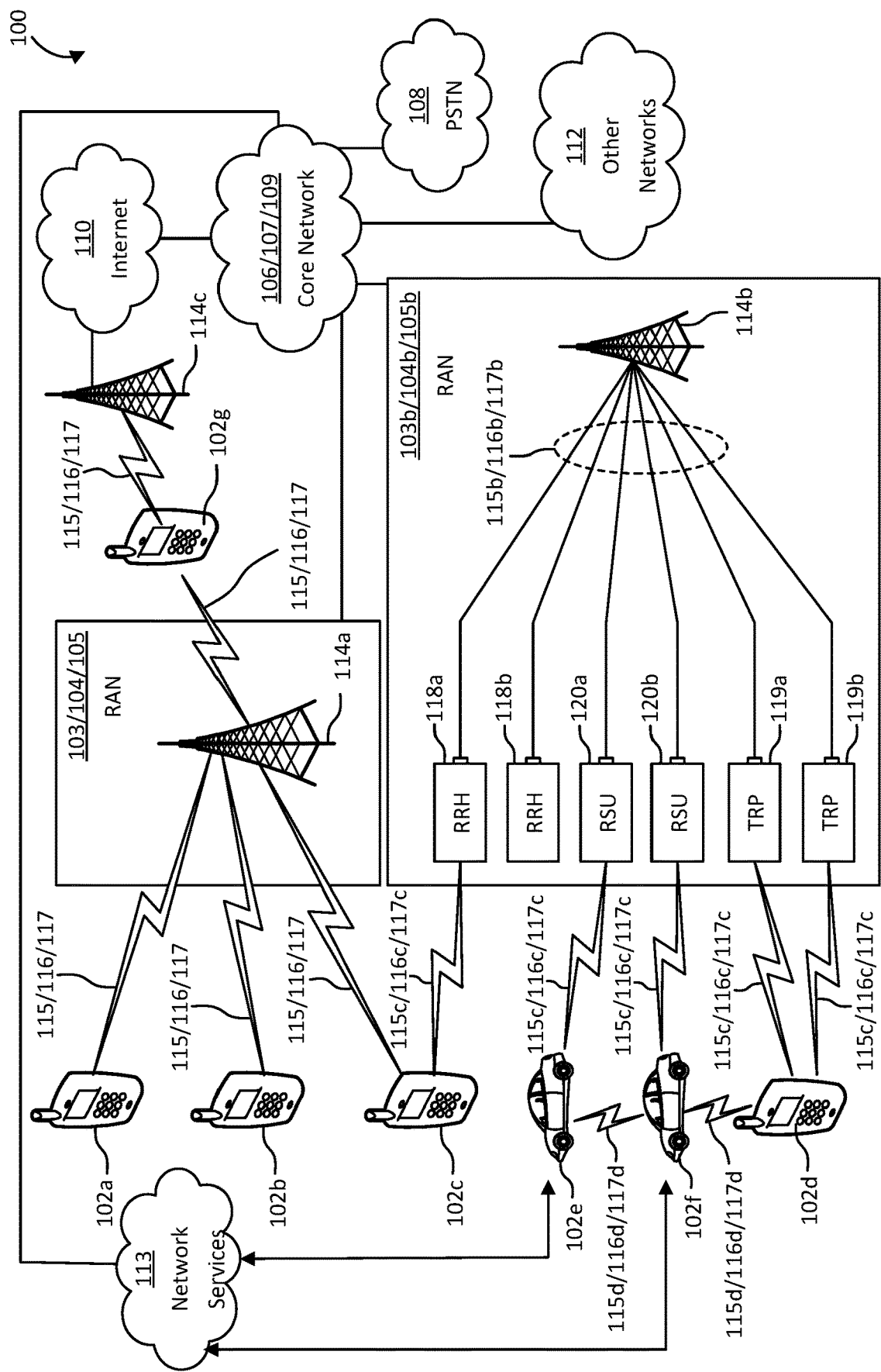
FIG. 20A illustrates an example communications system.

FIG. 20A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 20A, each of the WTRUs 102 is depicted in FIGS. 20A-20E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 20A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b, and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b, and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 20A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell.

As shown in FIG. 20A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 20A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 20A may be configured to communicate with the base station 114a, which may employ a cellular-based radio technology, and with the base station 114c, which may employ an IEEE 802 radio technology.

Although not shown in FIG. 20A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 20B:
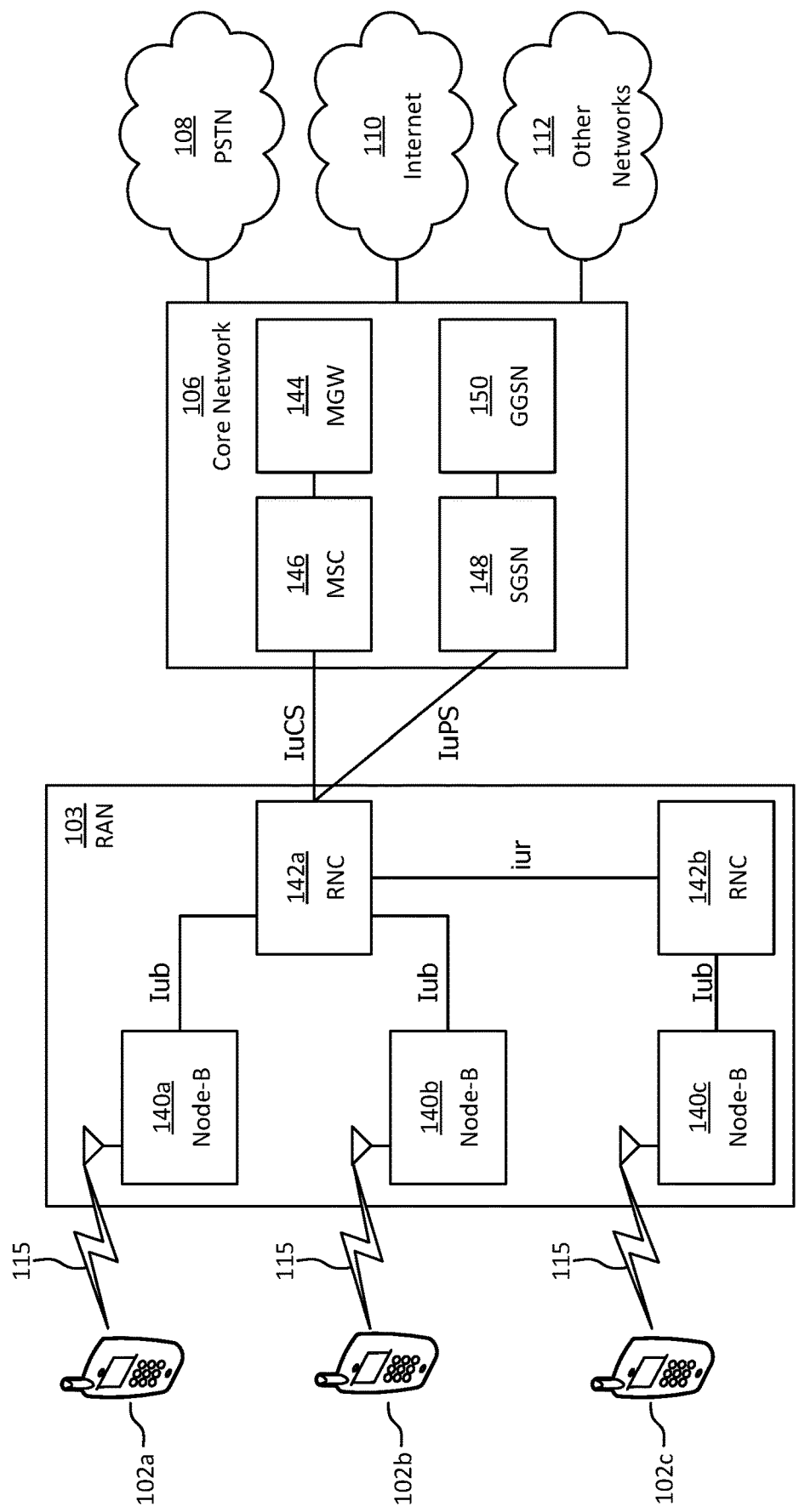
FIGS. 20B, 20C, and 20D are system diagrams of example RANs and core networks.

FIG. 20B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 20B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a and 142b. It will be appreciated that the RAN 103 may include any number of Node-Bs and Radio Network Controllers (RNCs.)

As shown in FIG. 20B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 20B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 20C:
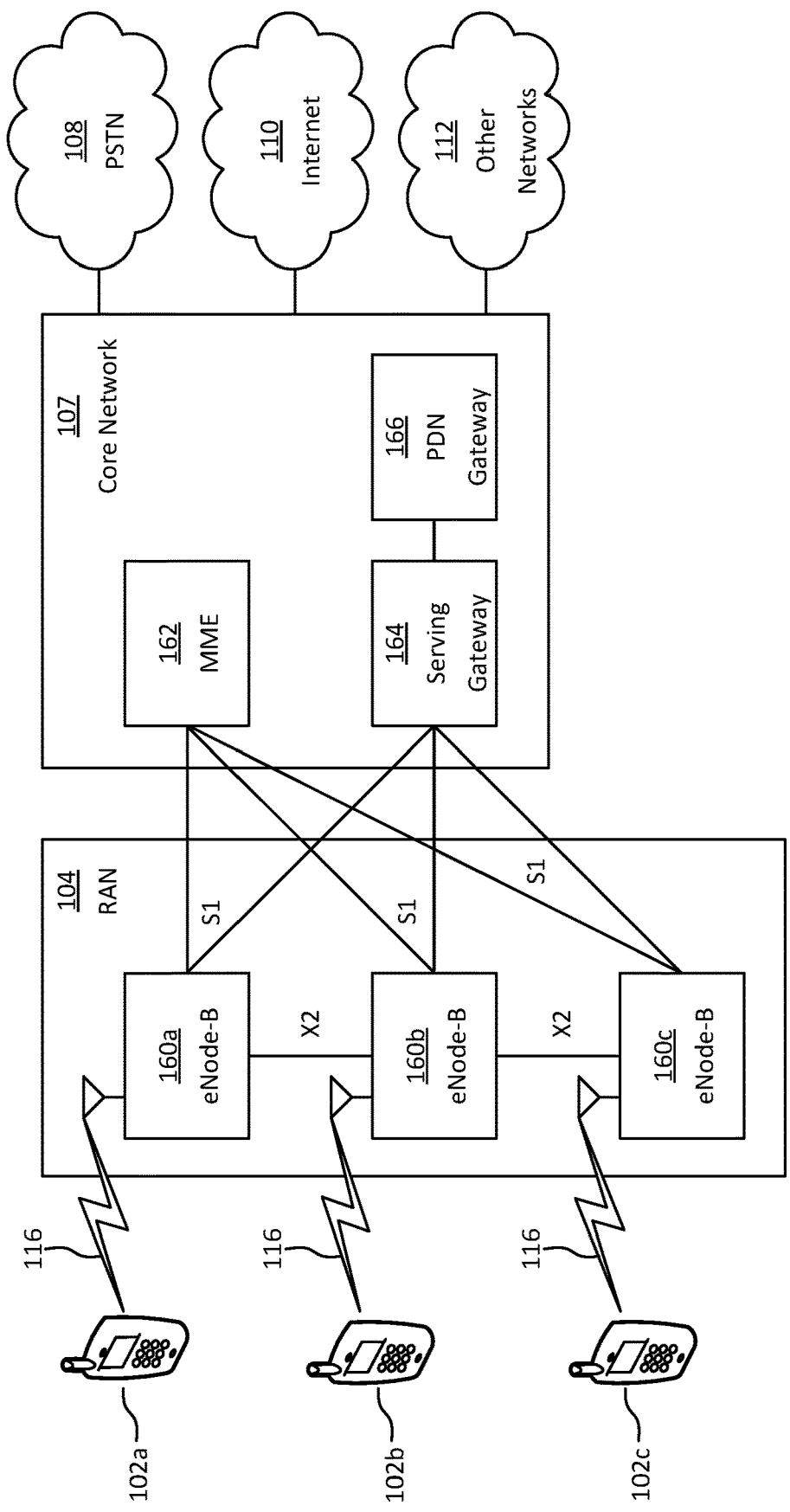

FIG. 20C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 20C, the eNode-Bs 160a, 160b, and 160c may communicate with one another over an X2 interface.

The core network 107 shown in FIG. 20C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, and 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 20D:
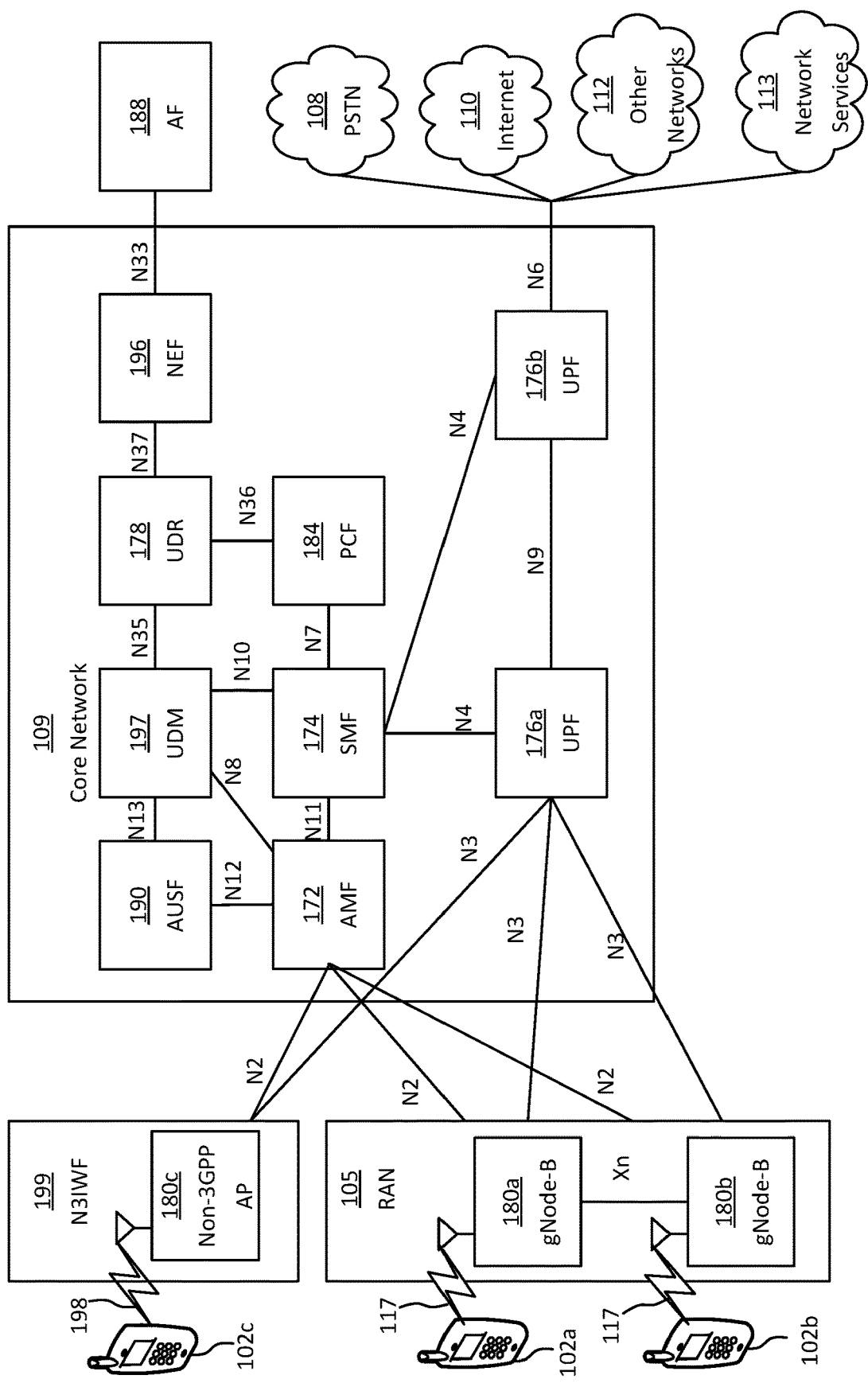

FIG. 20D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 20D, the gNode-Bs 180a and 180b may communicate with one another over an Xn interface, for example.

The core network 109 shown in FIG. 20D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 20G.

In the example of FIG. 20D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, and/or a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 20D shows that network functions directly connect to one another, however, it should be appreciated that they may communicate via routing agents such as a diameter routing agent or message buses.

In the example of FIG. 20D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, and/or access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 20D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c, and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, and downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 20D. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance, and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 20D, in a network slicing scenario, a WTRU 102*a*, 102*b*, or 102*c* may connect to an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned and/or operated by other service providers.

The core network entities described herein and illustrated in FIGS. 20A, 20C, 20D, and 20E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 20A, 20B, 20C, 20D, and 20E are provided by way of example only, and it is understood that the subject matter disclosed and claimed herein may be embodied or implemented in any similar communication system, whether presently defined or defined in the future.

Figure 20E:
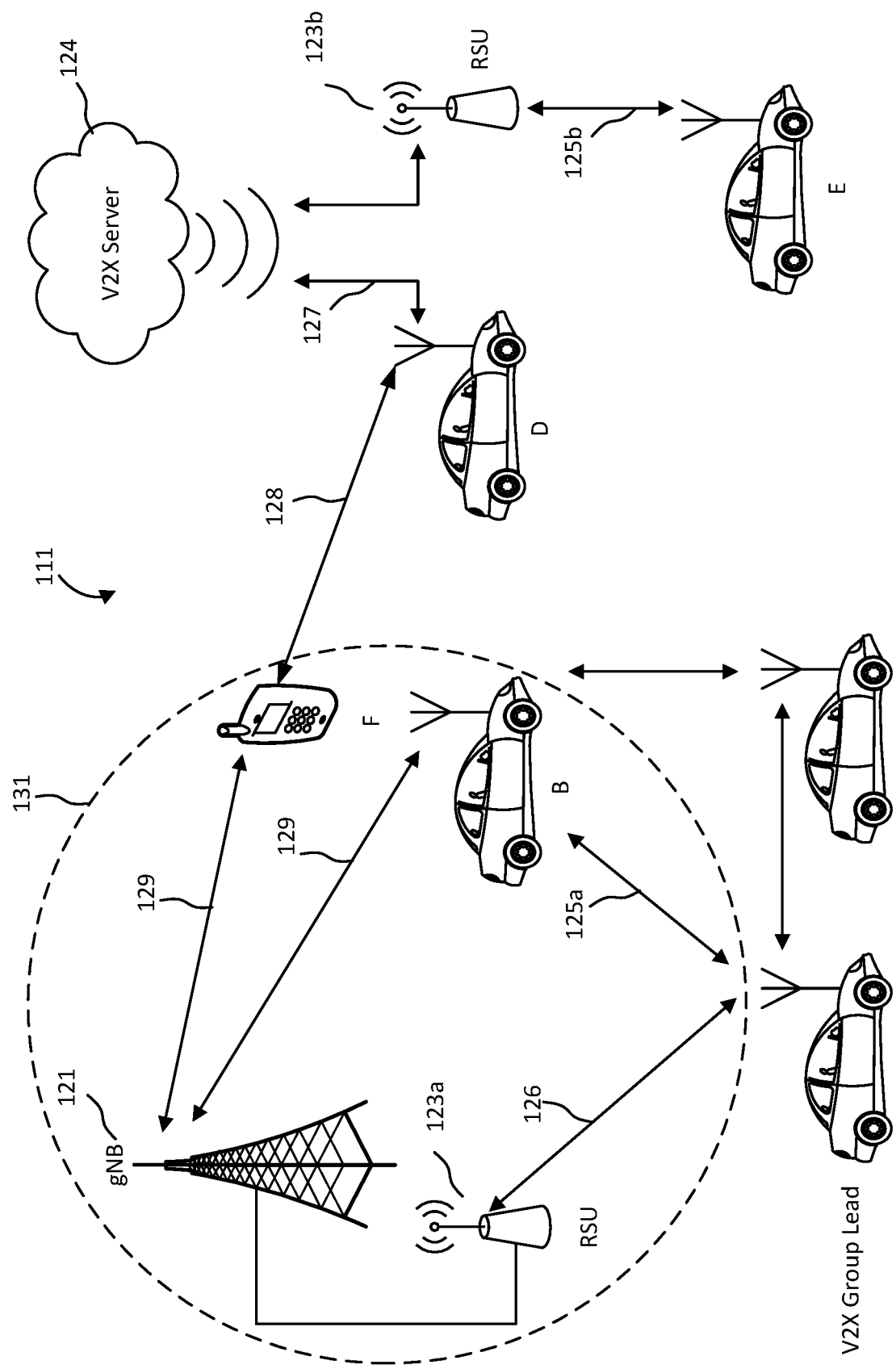
FIG. 20E illustrates another example communications system.

FIG. 20E illustrates an example communications system 111 in which the systems, methods, and apparatuses described herein may be used. Communications system 111 may include Wireless Transmit/Receive Units (WTRUs) A, B, C, D, E, F, a base station gNB 121, a V2X server 124, and Road-Side Units (RSUs) 123*a* and 123*b*. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 20E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 20E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 20F:
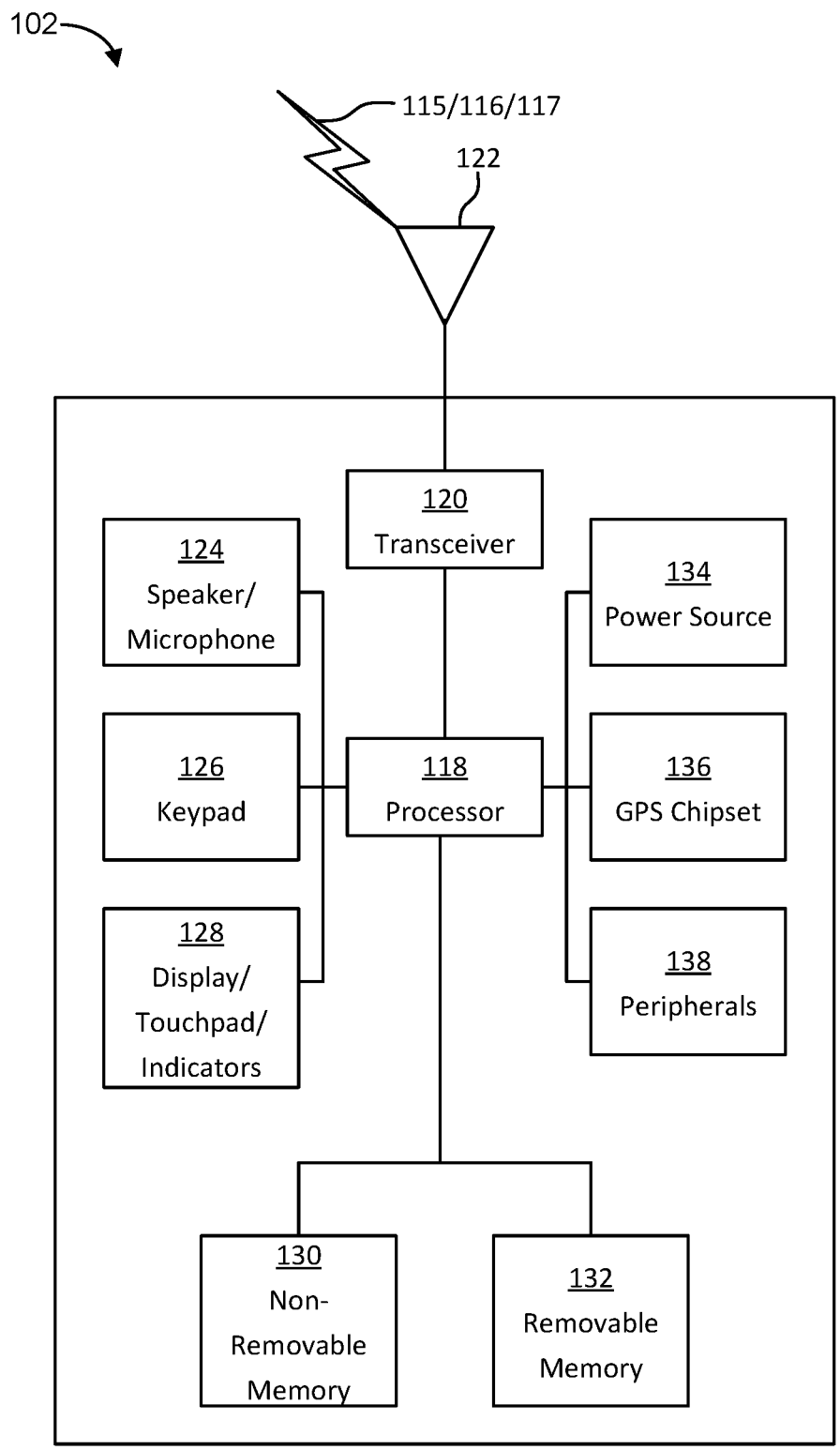
FIG. 20F is a block diagram of an example apparatus or device, such as a WTRU.

FIG. 20F is a block diagram of an example apparatus or device WTRU 102 that may be configured for wireless communications and operations in accordance with the systems, methods, and apparatuses described herein, such as a WTRU 102 of FIG. 20A, 20B, 20C, 20D, or 20E. As shown in FIG. 20F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 20F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 20F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 20A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 20F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 20G:
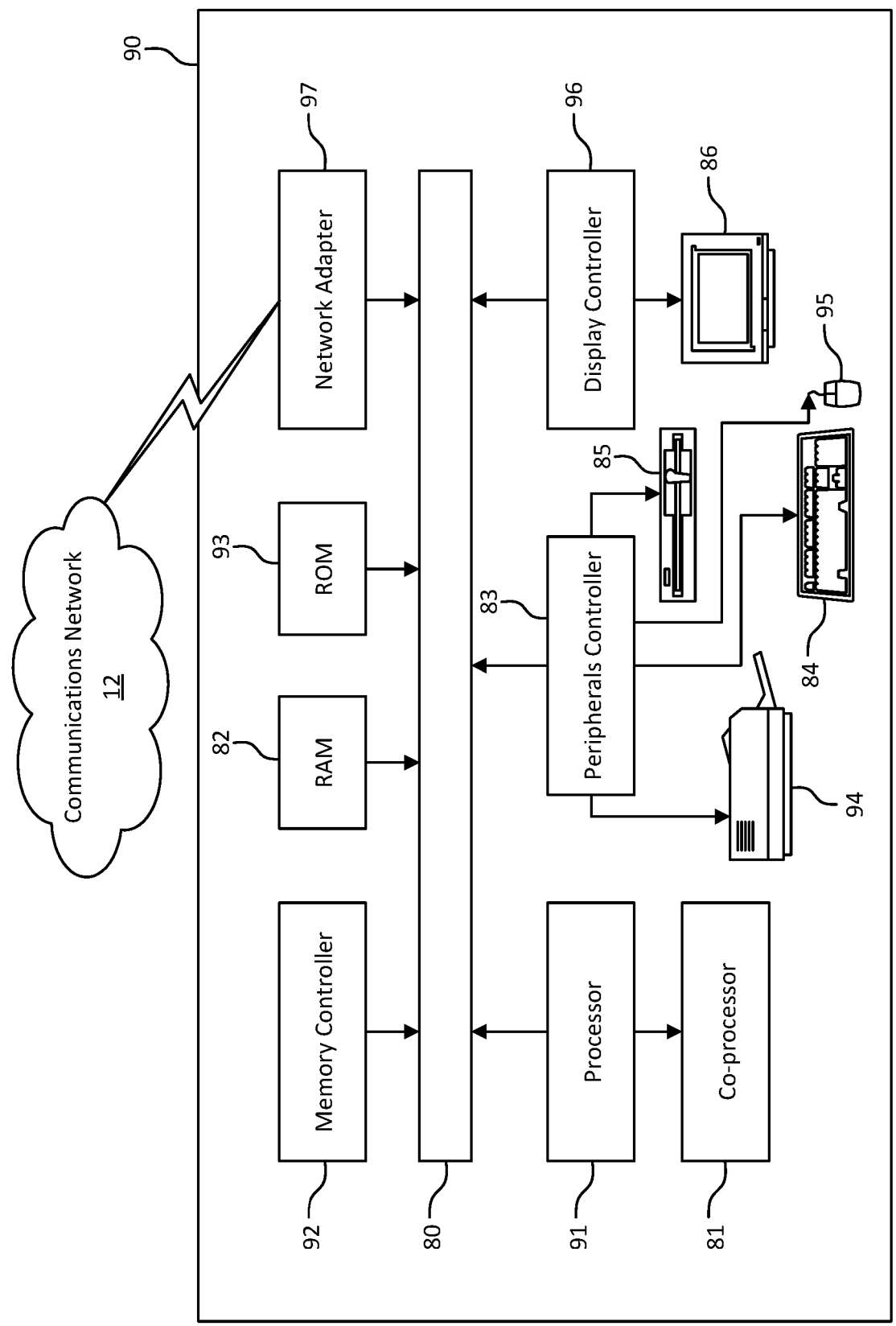
FIG. 20G is a block diagram of an exemplary computing system.

FIG. 20G is a block diagram of an exemplary computing system 90 in which one or more apparatuses of the communications networks illustrated in FIGS. 20A, 20C, 20D, and 20E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 20A, 20B, 20C, 20D, and 20E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods, and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A first wireless transmit/receive unit (WTRU) comprising:
   a processor and a memory, wherein the processor and the memory are configured to:
   send, to a second WTRU, an initial beam pair link establishment indicator, wherein the initial beam pair link establishment indicator comprises information indicating time domain and frequency domain resources to be used for initial beam sweeping;
   transmit a first set of swept beams via the time domain and frequency domain resources indicated by the initial beam pair link establishment indicator, each beam of the first set of swept beams comprising a reference signal; and
   receive, from the second WTRU, an indication of one or more preferred beams comprising one or more beams selected from the first set of swept beams.

2. The first WTRU of claim 1, wherein the initial beam pair link establishment indicator is a Sidelink Demodulation Reference Signal (SL-DMRS) transmitted on a Physical Sidelink Control Channel (PSCCH).

3. The first WTRU of claim 1, wherein the initial beam pair link establishment indicator is a Medium Access Control-Control Element (MAC-CE) transmitted on a Physical Sidelink Control Channel (PSCCH).

4. The first WTRU of claim 1, wherein the reference signal transmitted on the swept beams is a Sidelink Demodulation Reference Signal (SL-DMRS).

5. The first WTRU of claim 1, wherein the initial beam pair link establishment indicator comprises a reference signal configuration to be used for initial beam sweeping.

6. The first WTRU of claim 1, wherein the processor and the memory are further configured to:
   initiate beam pair link establishment with the second WTRU in response to a trigger from a higher layer of the first WTRU.

7. The first WTRU of claim 6, wherein the trigger is based on a Quality of Service (QOS) requirement.

8. The first WTRU of claim 1, wherein the processor and the memory are further configured to:
   send, to the second WTRU, the initial beam pair link establishment indicator in a first frequency range; and
   transmit the first set of swept beams in a second frequency range.

9. The first WTRU of claim 8, wherein the processor and the memory are further configured to receive, from the second WTRU in a connectionless state, the indication of one or more preferred beams via the first frequency range.

10. A second wireless transmit/receive unit (WTRU) comprising:
   a processor and a memory, wherein the processor and the memory are configured to:
   receive, from a first WTRU, an initial beam pair link establishment indicator, wherein the initial beam pair link establishment indicator comprises information indicating time domain and frequency domain resources to be used for initial beam sweeping;
   receive, from the first WTRU, one or more beams of a first set of swept beams via the time and frequency domain resources indicated by the initial beam pair link establishment indicator, each received beam comprising a reference signal;
   select, from the one or more received beams, one or more preferred beams; and
   send, to the first WTRU, an indication of the one or more preferred beams.

11. The second WTRU of claim 10, wherein the processor and the memory are further configured to indicate to the first WTRU that none of the received beams meets a minimum quality threshold.

12. The second WTRU of claim 10, wherein the processor and the memory are further configured to select the one or more preferred beams on the basis of one or more of Reference Signal Received Power (RSRP), Reference Signal Received Quality (RSRQ), Layer-1 Signal to Interference Noise Ratio (L1-SINR).

13. The second WTRU of claim 10, wherein the initial beam pair link establishment indicator is a Sidelink Demodulation Reference Signal (SL-DMRS) transmitted on a Physical Sidelink Control Channel (PSCCH).

14. The second WTRU of claim 10, wherein the initial beam pair link establishment indicator is a Medium Access Control-Control Element (MAC-CE) transmitted on a Physical Sidelink Control Channel (PSCCH).

15. The first WTRU of claim 10, wherein the reference signal transmitted on the swept beams is a Sidelink Demodulation Reference Signal (SL-DMRS).

16. The second WTRU of claim 10, wherein the initial beam pair link establishment indicator comprises a reference signal configuration to be used for initial beam sweeping.

17. The second WTRU of claim 10, wherein the processor and the memory are further configured to:
   receive, from the first WTRU, the initial beam pair link establishment indicator in a first frequency range; and
   receive, from the first WTRU, one or more beams of the first set of swept beams in a second frequency range.

18. The second WTRU of claim 17, wherein the processor and the memory are further configured to send, to the first WTRU in a connectionless state, the indication of one or more preferred beams via the first frequency range.

* * * * *